(12) United States Patent
Brunner et al.

(10) Patent No.: US 11,393,097 B2
(45) Date of Patent: Jul. 19, 2022

(54) USING LIGHT DETECTION AND RANGING (LIDAR) TO TRAIN CAMERA AND IMAGING RADAR DEEP LEARNING NETWORKS

(71) Applicant: QUALCOMM Incorporated, San Diego, CA (US)

(72) Inventors: Christopher Brunner, San Diego, CA (US); Radhika Dilip Gowaikar, San Diego, CA (US); Fu-Chun Yeh, San Diego, CA (US); Michael Joshua Shomin, Philadelphia, PA (US); John Anthony Dougherty, Philadelphia, PA (US); Jayakrishnan Unnikrishnan, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/734,752

(22) Filed: Jan. 6, 2020

(65) Prior Publication Data

US 2020/0219264 A1 Jul. 9, 2020

Related U.S. Application Data

(60) Provisional application No. 62/789,833, filed on Jan. 8, 2019.

(51) Int. Cl.
*G06T 7/11* (2017.01)
*G06T 7/20* (2017.01)
(Continued)

(52) U.S. Cl.
CPC .............. *G06T 7/11* (2017.01); *G06T 7/194* (2017.01); *G06T 7/20* (2013.01); *G06T 7/70* (2017.01);
(Continued)

(58) Field of Classification Search
CPC ...... G01S 13/865; G01S 13/867; G01S 13/89; G01S 13/931; G01S 17/86; G01S 17/89;
(Continued)

(56) References Cited

U.S. PATENT DOCUMENTS 10,169,680 B1 1/2019 Sachdeva et al.
10,884,409 B2 * 1/2021 Mercep ................... G01S 7/417
(Continued)

OTHER PUBLICATIONS

Asvadi A., et al., "DepthCN: Vehicle Detection Using 3D-LIDAR and ConvNet", 2017 IEEE 20th International Conference On Intelligent Transportation Systems (ITSC), IEEE, Oct. 16, 2017 (Oct. 16, 2017), pp. 1-6, XP033330533, DOI: 10.1109/ITSC.2017.8317880, [retrieved on Mar. 14, 2018], the whole document.
(Continued)

*Primary Examiner* — Bobbak Safaipour
(74) *Attorney, Agent, or Firm* — Qualcomm Incorporated

(57) ABSTRACT

Disclosed are techniques for annotating image frames using information from a light detection and ranging (LiDAR) sensor. An exemplary method includes receiving, from the LiDAR sensor, at least one LiDAR frame, receiving, from a camera sensor, at least one image frame, removing LiDAR points that represent a ground surface of the environment, identifying LiDAR points of interest in the at least one LiDAR frame, segmenting the LiDAR points of interest to identify at least one object of interest in the at least one LiDAR frame, and annotating the at least one image frame with a three-dimensional oriented bounding box of the at least one object of interest detected in the at least one image
(Continued)

frame by projecting the three-dimensional oriented bounding boxes from the at least one LiDAR frame to the at least one image frame using cross-calibration transforms between the LiDAR sensor and the camera.

26 Claims, 21 Drawing Sheets

(51) Int. Cl.
    *G06T 7/194*     (2017.01)
    *G06T 7/70*     (2017.01)

(52) U.S. Cl.
    CPC ............... *G06T 2207/10028* (2013.01); *G06T 2207/20081* (2013.01); *G06T 2207/20084* (2013.01); *G06T 2207/30252* (2013.01)

(58) Field of Classification Search
    CPC .......... G01S 17/931; G01S 2013/9316; G01S 2013/93271; G01S 7/417; G01S 7/4802; G01S 7/4808; G06K 9/00805; G06K 9/3241; G06K 9/627; G06N 3/08; G06N 5/003; G06N 5/022; G06T 19/00; G06T 2207/10028; G06T 2207/20081; G06T 2207/20084; G06T 2207/30252; G06T 2207/30261; G06T 2210/12; G06T 2219/004; G06T 7/11; G06T 7/194; G06T 7/20; G06T 7/70; H04L 65/4084; H04L 65/601; H04L 65/604; H04L 65/608; H04L 67/02; H04N 21/2223; H04N 21/23439; H04N 21/2387; H04N 21/26258; H04N 21/2662; H04N 21/278; H04N 21/4147; H04N 21/47202; H04N 21/6581; H04N 21/845; H04N 21/8456; H04N 21/8586

See application file for complete search history.

(56) References Cited

U.S. PATENT DOCUMENTS

| | | | |
|---|---|---|---|
| 2006/0080356 A1* | 4/2006 | Burges ................... | G06F 16/40 |
| 2013/0215115 A1* | 8/2013 | Jenkins ................... | G06F 16/56 |
| | | | 345/419 |
| 2015/0269438 A1* | 9/2015 | Samarasekera ...... | G08G 5/0069 |
| | | | 382/154 |
| 2017/0177739 A1* | 6/2017 | Algotar ................. | G06N 20/00 |
| 2018/0144458 A1* | 5/2018 | Xu .............................. | G06T 7/73 |
| 2018/0231654 A1 | 8/2018 | Bilik et al. | |
| 2018/0293445 A1 | 10/2018 | Gao et al. | |
| 2019/0025853 A1* | 1/2019 | Julian ....................... | G06T 7/74 |
| 2019/0065944 A1* | 2/2019 | Hotson ................... | G06N 3/084 |
| 2020/0125112 A1* | 4/2020 | Mao ........................ | G01S 17/86 |
| 2020/0174132 A1* | 6/2020 | Nezhadarya ............ | G06T 7/521 |
| 2020/0175315 A1* | 6/2020 | Gowaikar ............ | G05D 1/0257 |
| 2020/0219264 A1* | 7/2020 | Brunner ............... | G01S 7/4802 |
| 2021/0241026 A1* | 8/2021 | Deng ................... | G06K 9/6267 |

OTHER PUBLICATIONS

International Search Report and Written Opinion—PCT/US2020/012727—ISAEPO—dated Jul. 15, 2020.
Partial International Search Report—PCT/US2020/012727—ISA/EPO—dated Apr. 8, 2020.
Xu D., et al., "PointFusion: Deep Sensor Fusion for 3D Bounding Box Estimation", arxiv.org, Cornell University Library, 201 Olin Library Cornell University Ithaca, NY, 14853,Nov. 29, 2017 (Nov. 29, 2017), XP081410888, 11 pages, figures 2,4.

* cited by examiner

USING LIGHT DETECTION AND RANGING (LIDAR) TO TRAIN CAMERA AND IMAGING RADAR DEEP LEARNING NETWORKS

CROSS-REFERENCE TO RELATED APPLICATIONS

The present application for patent claims the benefit of U.S. Provisional Application No. 62/789,833, entitled "USING LIDAR TO TRAIN CAMERA AND IMAGING RADAR DEEP LEARNING NETWORKS," filed Jan. 8, 2019, assigned to the assignee hereof, and expressly incorporated herein by reference in its entirety.

INTRODUCTION

1. Technical Field

Aspects of this disclosure relate generally to autonomous or semi-autonomous driving techniques, and more specifically, to using light detection and ranging (LiDAR) to train camera and imaging radar deep learning networks.

2. Background

Modern motor vehicles are increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention.

There are six levels that have been defined to achieve full automation. At Level 0, the human driver does all the driving. At Level 1, an advanced driver assistance system (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

These and other safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize radio frequency (RF) waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for annotating image frames using information from a LiDAR sensor of a first vehicle includes receiving, from the LiDAR sensor, at least one LiDAR frame representing an environment of the first vehicle, the at least one LiDAR frame comprising a plurality of LiDAR points, receiving, from a camera sensor or an imaging radar sensor of the first vehicle, at least one image frame of the environment of the first vehicle, removing LiDAR points from the at least one LiDAR frame that represent a ground surface of the environment of the first vehicle, identifying LiDAR points of interest in the at least one LiDAR frame, segmenting the LiDAR points of interest to identify at least one object of interest in the at least one LiDAR frame, and annotating the at least one image frame with a three-dimensional oriented bounding box of the at least one object of interest detected in the at least one image frame by projecting the three-dimensional oriented bounding boxes from the at least one LiDAR frame to the at least one image frame using cross-calibration transforms between the LiDAR sensor and the camera sensor or between the LiDAR sensor and the imaging radar sensor.

In an aspect, a method performed by at least one processor of an ego vehicle includes receiving, from an imaging radar sensor of the ego vehicle, at least one radar frame of the environment of the ego vehicle, detecting at least one object of interest in the at least one radar frame, determining a three-dimensional oriented bounding box, a location, and a velocity of the at least one object of interest, and outputting the three-dimensional oriented bounding box, the location, and the velocity of the at least one object of interest.

In an aspect, an apparatus for annotating image frames using information from a LiDAR sensor of a first vehicle includes at least one processor configured to receive, from the LiDAR sensor, at least one LiDAR frame representing an environment of the first vehicle, the at least one LiDAR frame comprising a plurality of LiDAR points, receive, from a camera sensor or an imaging radar sensor, at least one image frame of the environment of the first vehicle, remove LiDAR points from the at least one LiDAR frame that represent a ground surface of the environment of the first vehicle, identify LiDAR points of interest in the at least one LiDAR frame, segment the LiDAR points of interest to identify at least one object of interest in the at least one LiDAR frame, and annotate the at least one image frame with a three-dimensional oriented bounding box of the at least one object of interest detected in the at least one image frame by projecting the three-dimensional oriented bounding box from the at least one LiDAR frame to the at least one image frame using cross-calibration transforms between the LiDAR sensor and the camera sensor or between the LiDAR sensor and the imaging radar sensor.

In an aspect, an ego vehicle includes at least one processor configured to receive, from an imaging radar sensor of the ego vehicle, at least one radar frame of the environment of the ego vehicle, detect at least one object of interest in the at least one radar frame, determine a three-dimensional oriented bounding box, a location, and a velocity of the at least one object of interest, and output the three-dimensional oriented bounding box, the location, and the velocity of the at least one object of interest.

In an aspect, an apparatus for annotating image frames using information from a LiDAR sensor includes means for receiving, from the LiDAR sensor of a first vehicle, at least one LiDAR frame representing an environment of the first vehicle, the at least one LiDAR frame comprising a plurality of LiDAR points, means for receiving, from a camera sensor or an imaging radar sensor, at least one image frame of the environment of the first vehicle, means for removing LiDAR points from the at least one LiDAR frame that represent a ground surface of the environment of the first vehicle, means for identifying LiDAR points of interest in the at least one LiDAR frame, means for segmenting the LiDAR points of interest to identify at least one object of interest in the at least one LiDAR frame, and means for annotating the at least one image frame with a three-dimensional oriented bounding box of the at least one object of interest detected in the at least one image frame by projecting the three-dimensional oriented bounding box from the at least one LiDAR frame to the at least one image frame using cross-calibration transforms between the LiDAR sensor and the camera sensor or between the LiDAR sensor and the imaging radar sensor.

In an aspect, an ego vehicle includes means for receiving, from an imaging radar sensor of the ego vehicle, at least one radar frame of the environment of the ego vehicle, means for detecting at least one object of interest in the at least one radar frame, means for determining a three-dimensional oriented bounding box, a location, and a velocity of the at least one object of interest, and means for outputting the three-dimensional oriented bounding box, the location, and the velocity of the at least one object of interest.

In an aspect, a non-transitory computer-readable medium storing computer-executable instructions for annotating image frames using information from a LiDAR sensor of a first vehicle includes computer-executable instructions comprising at least one instruction instructing at least one processor to receive, from the LiDAR sensor, at least one LiDAR frame representing an environment of the first vehicle, the at least one LiDAR frame comprising a plurality of LiDAR points, at least one instruction instructing the at least one processor to receive, from a camera sensor or an imaging radar sensor, at least one image frame of the environment of the first vehicle, at least one instruction instructing the at least one processor to remove LiDAR points from the at least one LiDAR frame that represent a ground surface of the environment of the first vehicle, at least one instruction instructing the at least one processor to identify LiDAR points of interest in the at least one LiDAR frame, at least one instruction instructing the at least one processor to segment the LiDAR points of interest to identify at least one object of interest in the at least one LiDAR frame, and at least one instruction instructing the at least one processor to annotate the at least one image frame with a three-dimensional oriented bounding box of the at least one object of interest detected in the at least one image frame by projecting the three-dimensional oriented bounding box from the at least one LiDAR frame to the at least one image frame using cross-calibration transforms between the LiDAR sensor and the camera sensor or between the LiDAR sensor and the imaging radar sensor.

In an aspect, a non-transitory computer-readable medium storing computer-executable instructions includes computer-executable instructions comprising at least one instruction instructing at least one processor of an ego vehicle to receive, from an imaging radar sensor of the ego vehicle, at least one radar frame of the environment of the ego vehicle, at least one instruction instructing the at least one processor to detect at least one object of interest in the at least one radar frame, at least one instruction instructing the at least one processor to determine a three-dimensional oriented bounding box, a location, and a velocity of the at least one object of interest, and at least one instruction instructing the at least one processor to output the three-dimensional oriented bounding box, the location, and the velocity of the at least one object of interest.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
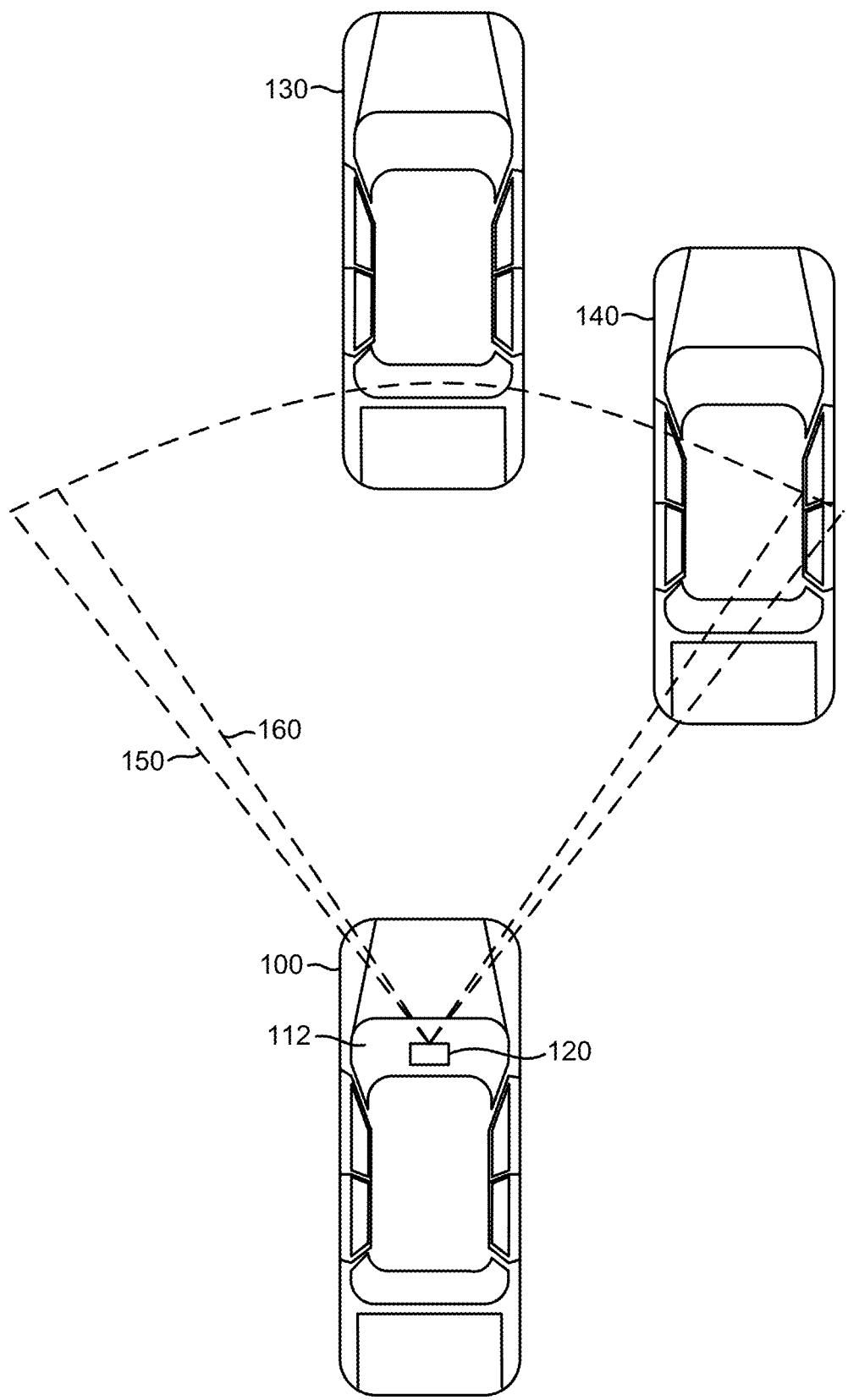
FIG. 1 is a top view of a vehicle employing an integrated radar-camera sensor behind the windshield, according to various aspects of the disclosure.

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. In addition, for each of the aspects described herein, the corresponding form of any such aspect may be implemented as, for example, "logic configured to" perform the described action.

Autonomous and semi-autonomous driving safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize radio frequency (RF) waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Referring now to FIG. 1, a vehicle 100 (referred to as an "ego vehicle" or a "host vehicle") is illustrated that includes a radar-camera sensor module 120 located in the interior compartment of the vehicle 100 behind the windshield 112. The radar-camera sensor module 120 includes a radar component configured to transmit radar signals through the windshield 112 in a horizontal coverage zone 150 (shown by dashed lines), and receive reflected radar signals that are reflected off of any objects within the coverage zone 150. The radar-camera sensor module 120 further includes a camera component for capturing images based on light waves that are seen and captured through the windshield 112 in a horizontal coverage zone 160 (shown by dashed lines).

Although FIG. 1 illustrates an example in which the radar component and the camera component are collocated components in a shared housing, as will be appreciated, they may be separately housed in different locations within the vehicle 100. For example, the camera may be located as shown in FIG. 1, and the radar component may be located in the grill or front bumper of the vehicle 100. Additionally, although FIG. 1 illustrates the radar-camera sensor module 120 located behind the windshield 112, it may instead be located in a rooftop sensor array, or elsewhere. Further, although FIG. 1 illustrates only a single radar-camera sensor module 120, as will be appreciated, the vehicle 100 may have multiple radar-camera sensor modules 120 pointed in different directions (to the sides, the front, the rear, etc.). The various radar-camera sensor modules 120 may be under the "skin" of the vehicle (e.g., behind the windshield 112, door panels, bumpers, grills, etc.) or within a rooftop sensor array.

The radar-camera sensor module 120 may detect one or more (or none) objects relative to the vehicle 100. In the example of FIG. 1, there are two objects, vehicles 130 and 140, within the horizontal coverage zones 150 and 160 that the radar-camera sensor module 120 can detect. The radar-camera sensor module 120 may estimate parameters (attributes) of the detected object(s), such as the position, range, direction, speed, size, classification (e.g., vehicle, pedestrian, road sign, etc.), and the like. The radar-camera sensor module 120 may be employed onboard the vehicle 100 for automotive safety applications, such as adaptive cruise control (ACC), forward collision warning (FCW), collision mitigation or avoidance via autonomous braking, lane departure warning (LDW), and the like.

Collocating the camera and radar permits these components to share electronics and signal processing, and in particular, enables early radar-camera data fusion. For example, the radar sensor and camera may be integrated onto a single board. A joint radar-camera alignment technique may be employed to align both the radar sensor and the camera. However, collocation of the radar sensor and camera is not required to practice the techniques described herein.

Figure 2:
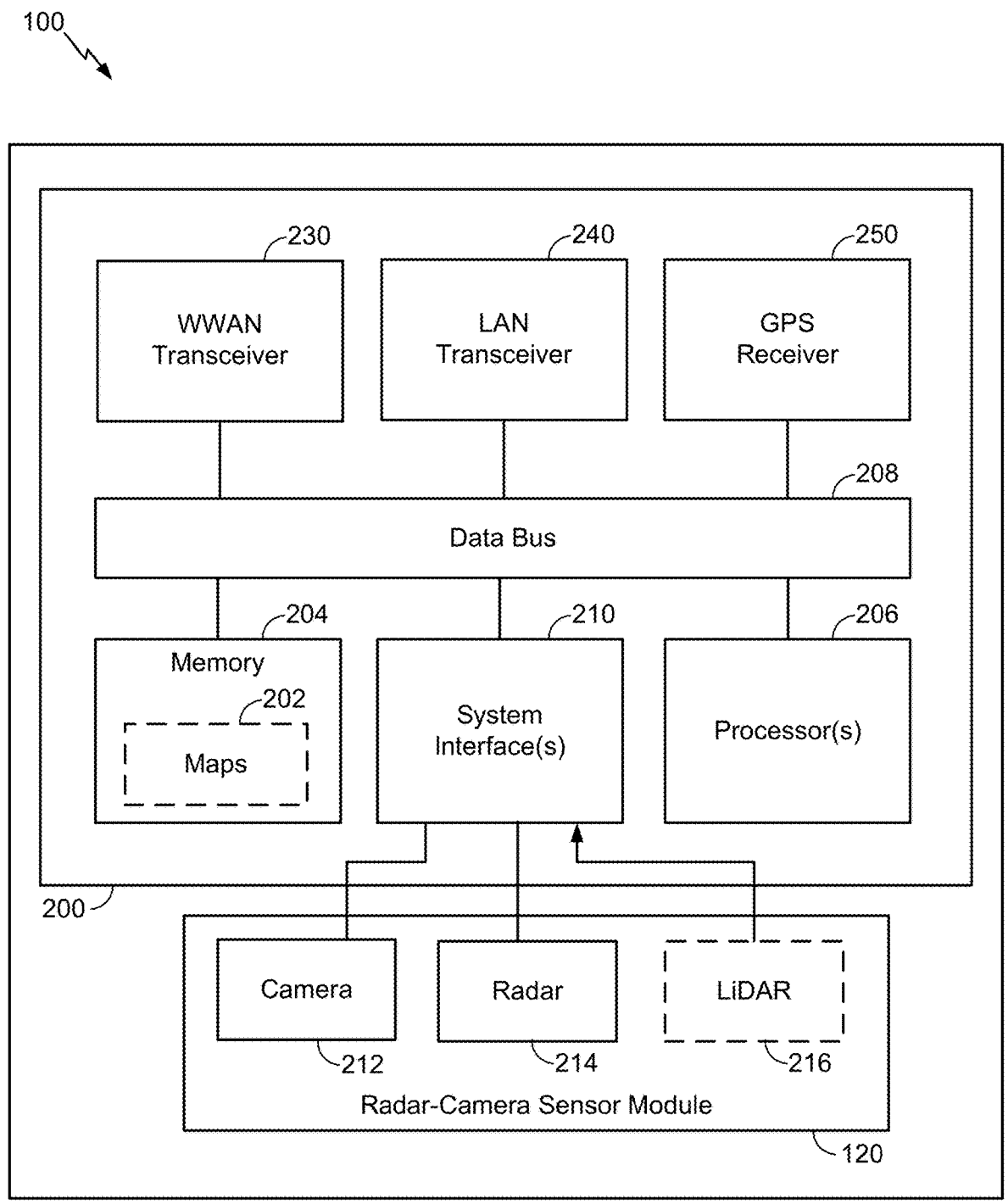
FIG. 2 illustrates an on-board computer architecture, according to various aspects of the disclosure.

FIG. 2 illustrates an on-board computer (OBC) 200 of a vehicle 100, according to various aspects of the disclosure. In an aspect, the OBC 200 may be part of an ADAS or ADS. The OBC 200 includes a non-transitory computer-readable storage medium, i.e., memory 204, and one or more processors 206 in communication with the memory 204 via a data bus 208. The memory 204 includes one or more storage modules storing computer-readable instructions executable by the processor(s) 206 to perform the functions of the OBC 200 described herein. For example, the processor(s) 206 in conjunction with the memory 204 may implement the various neural network architectures described herein.

One or more radar-camera sensor modules 120 are coupled to the OBC 200 (only one is shown in FIG. 2 for simplicity). In some aspects, the radar-camera sensor module 120 includes at least one camera 212, at least one radar 214, and an optional light detection and ranging (LiDAR) sensor 216. The OBC 200 also includes one or more system interfaces 220 connecting the processor(s) 206, by way of the data bus 208, to the radar-camera sensor module 120 and, optionally, other vehicle sub-systems (not shown).

The OBC 200 also includes, at least in some cases, a wireless wide area network (WWAN) transceiver 230 configured to communicate via one or more wireless communication networks (not shown), such as an NR network, an LTE network, a GSM network, and/or the like. The WWAN transceiver 230 may be connected to one or more antennas (not shown) for communicating with other network nodes, such as other vehicle UEs, pedestrian UEs, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceiver 230 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 200 also includes, at least in some cases, a wireless local area network (WLAN) transceiver 240. The WLAN transceiver 240 may be connected to one or more antennas (not shown) for communicating with other network nodes, such as other vehicle UEs, pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The WLAN transceiver 240 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 200 also includes, at least in some cases, a global positioning systems (GPS) receiver 250. The GPS receiver 250 may be connected to one or more antennas (not shown) for receiving satellite signals. The GPS receiver 250 may comprise any suitable hardware and/or software for receiving and processing GPS signals. The GPS receiver 250 requests information and operations as appropriate from the other systems, and performs the calculations necessary to determine the vehicle's 100 position using measurements obtained by any suitable GPS algorithm.

In an aspect, the OBC 200 may utilize the WWAN transceiver 230 and/or the WLAN transceiver 240 to download one or more maps 202 that can then be stored in memory 204 and used for vehicle navigation. Map(s) 202 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 100. Map(s) 202 may also provide electronic horizon predictive awareness, which enables the vehicle 100 to know what lies ahead.

In an aspect, the camera 212 may capture image frames (also referred to herein as camera frames) of the scene within the viewing area of the camera 212 (as illustrated in FIG. 1 as horizontal coverage zone 160) at some periodic rate. Likewise, the radar 214 may capture radar frames of the scene within the viewing area of the radar 214 (as illustrated in FIG. 1 as horizontal coverage zone 150) at some periodic rate. The periodic rates at which the camera 212 and the radar 214 capture their respective frames may be the same or different. Each camera and radar frame may be timestamped. Thus, where the periodic rates are different, the timestamps can be used to select simultaneously, or nearly simultaneously, captured camera and radar frames for further processing (e.g., fusion).

Figure 3:
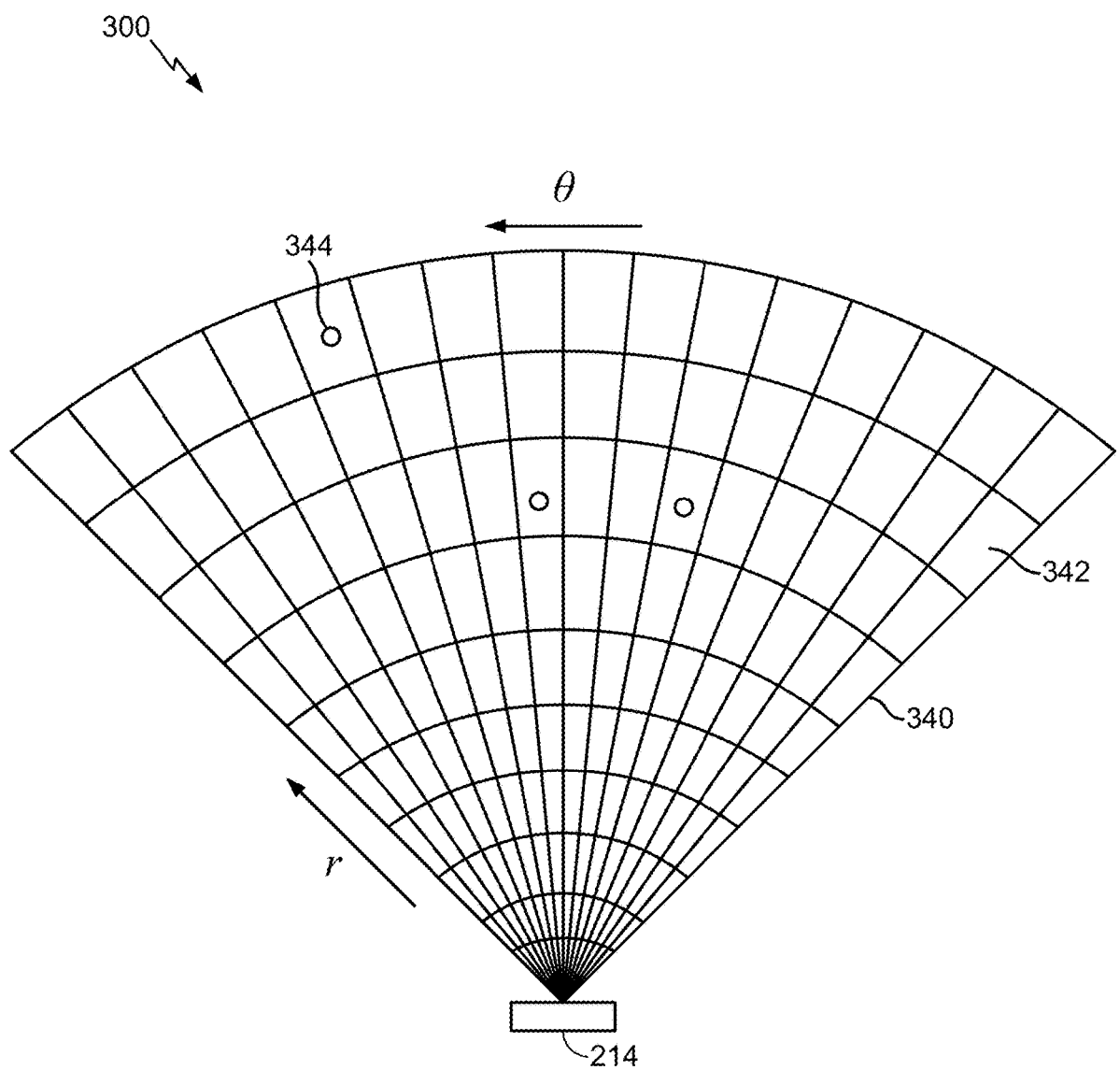
FIG. 3 is a schematic of a sensed observation radar grid, according to various aspects of the disclosure.

FIG. 3 illustrates a sensed observation radar grid 300. A transmitter (e.g., an array of transmit antennas) of the radar 214 transmits pulses of electromagnetic RF waves that reflect from object(s) in the transmission path, such as vehicles 130 and 140 in FIG. 1. A portion of the electromagnetic RF waves that are reflected from the object(s) are returned to the receiver (e.g., an array of receive antennas) of the radar 214, which is usually located at the same site as the transmitter of the radar 214.

In an aspect, the radar 214 may be an imaging radar that uses beamforming to scan horizontally and vertically. Beamforming is a technique used to aim the effective direction of a radar beam by changing the delay between different transmitting antennas so that the signals add constructively in a specified direction. Thus, the radar 214 may scan horizontally and vertically across the sensing area (e.g., horizontal coverage zone 150) by using a transmitter comprising an array of electronically steered antennas.

The returned responses (which may also be referred to as "pings") measured by the radar 214 is characterized as an observation (or occupancy) grid 340 having a plurality of observation cells 342. Each cell 342 represents the measured returned response value at a specific range (r) and angle/azimuth (θ). Each cell 342 is alternately referred to as a range-angle bin. Features 344 are extracted from the cells 342 to determine whether the feature 344 is an object (e.g., a vehicle 130/140). Each feature 344 within a respective cell 342 can be identified as having up to four parameters: range, Doppler, azimuth, and elevation. This is called a radar frame. As an example, a feature 344 within a cell 342 may be the signal-to-noise ratio (SNR) computed by a constant false alarm rate (CFAR) algorithm. However, it should be understood that other methods may be used to target and identify features 344 within a cell 342.

The processor(s) 206 generate four dimensional (4D) tensors for features 344 within cells 342 of the observation grid 340 detected by the radar 214. The generated tensors represent the range (distance from the vehicle 100 to the detected feature 344), azimuth (the horizontal distance between a feature 344 and a reference RF ray emitted by the radar 214, such as the initial RF ray of a radar sweep), Doppler (indicating the speed of the detected feature 344), and elevation (vertical direction from the radar 214 to the detected feature) of each detected feature 344. The processor(s) 206 then performs object detection, object classification, localization, and property/attribute estimation based on the tensors and undistorted camera frames received from the camera 212.

In contrast to images (e.g., from camera 212), radar signals (e.g., from radar 214) have several unique characteristics. One is specular reflections, in which only certain surfaces on the target having an advantageous orientation reflect the radar signal, which often results in a small number of reflections. A second is non-uniformity, in which objects that appear at the far range of the {range, azimuth} signal space are always smaller and have a different shape than those that appear at closer ranges. This is not the case with camera images.

Figure 4:
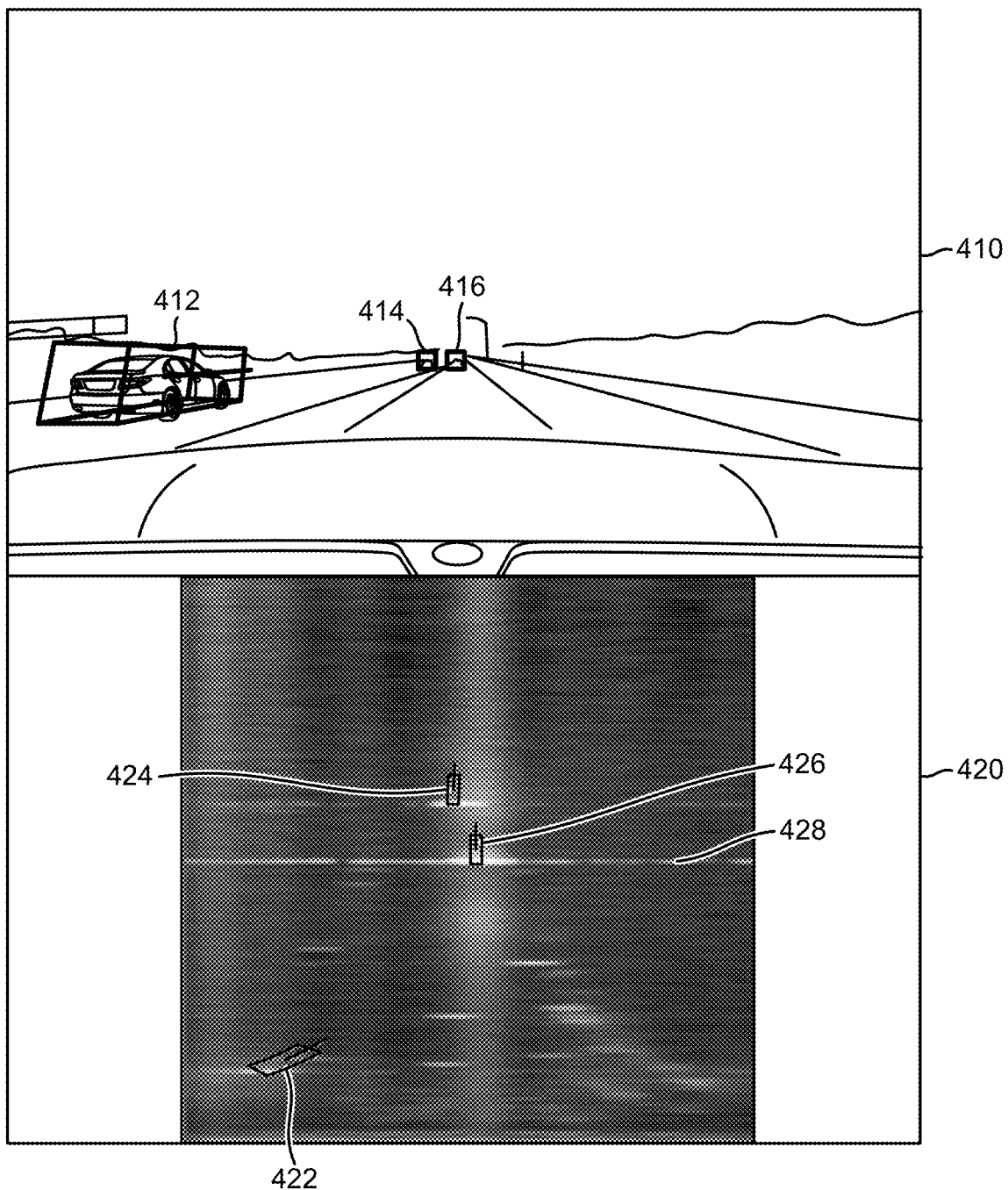
FIG. 4 illustrates a comparison between an exemplary camera frame and exemplary radar frame, according to various aspects of the disclosure.

FIG. 4 illustrates exemplary differences between a camera image 410 and a radar image 420 of the same scene. The camera image 410 may have been captured by the camera 212, and the radar image 420 may have been captured by the radar 214. The camera 212 captures raw camera frames of the scene within the viewing area of the camera 212 (as illustrated in FIG. 1 as horizontal coverage zone 160). The processor(s) 206 correct any distortion in the raw camera frames to generate undistorted camera frames that are used for processing with the radar tensors. The camera image 410 is an example of an undistorted camera frame. Note that the terms "frame" and "image" are used interchangeably herein.

The radar image 420 is captured and processed as discussed above with respect to FIG. 3. The camera image 410 and the radar image 420 are then processed to identify objects within the respective images. Object detection in radar images was discussed above with respect to FIG. 3. Object detection in camera images is well-known in the art and is therefore not further described here for the sake of brevity. Any object detection methods and/or techniques may be used to detect objects in the camera images.

The results of the object detection are various attributes of the detected object(s), including bounding boxes in Cartesian x-y(-z) coordinates that tightly enclose the object(s). In the camera image 410, three objects have been detected, each surrounded by a bounding box 412, 414, and 416. In the radar image 420, the same three objects have been detected and are surrounded by bounding boxes 422, 424, and 426. As can be seen in FIG. 4, the shapes of the objects/bounding boxes 422, 424, and 426 in the radar image 420 are different sizes and shapes based on whether or not they are below (i.e., bounding box 422) or above (i.e., bounding boxes 424 and 426) the midline 428 of radar image 420. In addition, the bounding boxes associated with the closer objects (e.g., bounding box 422) are larger than the bounding boxes associated with farther objects (e.g., bounding boxes 424 and 426) due to reception at the radar 214 of fewer reflected radio waves due to the greater distance between the radar 214 and the further objects.

Once one or more objects (or none) have been identified in the camera image 410, the processor(s) 206 may use pattern-recognition and/or object recognition algorithms to determine the classification (another attribute) of the object(s) as road signs, traffic barrels, cars, trucks, motorcycles, bicyclists, and pedestrians. The fine pixel resolution of an image enables precise angular localization of recognized objects. Range (another attribute of the object) may be estimated from stereo disparity if two cameras are used. Otherwise, a monocular system can estimate range from expected object size or displacement from the horizon. Object classification for radar images is more difficult, and often relies on correlating the object(s) detected in the radar image (e.g., radar image 420) to the object(s) detected in the corresponding (i.e., simultaneously, or nearly simultaneously, captured) camera image (e.g., camera image 410).

More specifically, the radar 214 provides reasonably accurate measurements of object distance and velocity in various weather conditions. However, radar systems typically have insufficient resolution to identify features of the detected objects. The camera 212, however, may provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

Further, recent advances in machine-learning techniques have made object-classification systems for both camera images and radar images much more effective. For example, deep neural networks (mathematical functions with many layers of nodes that resemble the connectivity of brain neurons) are now practical to train due to recently developed algorithms and the availability of "big data" image sets. The heavy mathematics can now be applied to every pixel in a video/radar stream in real time due to miniature supercomputers comprised of inexpensive graphics processing units (GPUs).

Figure 5:
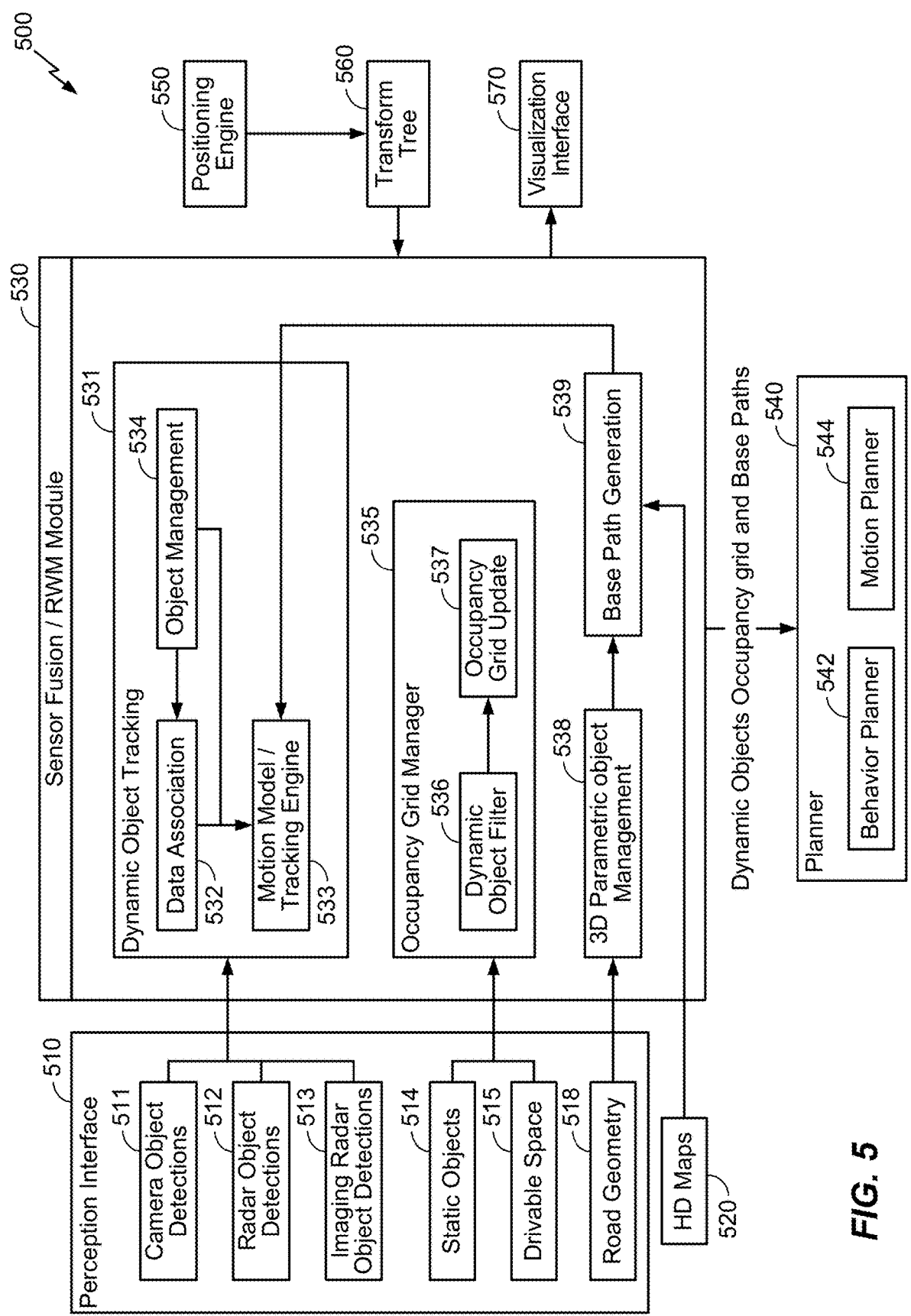
FIG. 5 illustrates an exemplary sensor fusion architecture, according to aspects of the disclosure.

FIG. 5 illustrates an exemplary sensor fusion architecture 500, according to aspects of the disclosure. In an aspect, the sensor fusion architecture 500 may be implemented by the radar-camera sensor module 120 and/or the OBC 200 of FIG. 2. A perception interface 510 of the sensor fusion architecture 500 provides inputs to a sensor fusion/real world model (RWM) module 530. In the example of FIG. 5, the perception interface 510 includes a camera object detection module 511 (which detects objects in the images captured by the camera 212), an optional radar object detection module 512 (which detects objects based on data from the optional LiDAR sensor 216), and an imaging radar object detection module 513 (which detects objects based on data from the radar 214). In order to reduce the data transfer budget, the camera object detection module 511 extracts the geometric and semantic information from the camera images and sends it to the sensor fusion/RWM module 530 without the camera images themselves. The perception interface 510 also includes information about static objects 514, drivable space 516, and road geometry 518 (obtained from the HD map(s) 520). The information about static objects 514 may be bounding box information, the same as for vehicles. Information about drivable space 516 may include a per pixel label indicating whether that pixel is drivable or not. The information about road geometry 518 may be a spline representation of the lane boundaries. The HD map(s) 520 for the region of travel (e.g., continental United States, North America, Europe, etc.) may be either pre-loaded or downloaded as needed.

In the example of FIG. 5, the sensor fusion/RWM module 530 of the sensor fusion architecture 500 includes a dynamic object tracking module 531 that includes a data association module 532, a motion model/tracking engine 533, and an object management module 534. The data association module 532 identifies which target object(s) in previous camera/radar frames are matched to currently detected object(s) and associates them with each other across the camera/radar frames. The dynamic object tracking module 531 receives the object detections from the camera object detection module 511, the optional radar object detection module 512, and the imaging radar object detection module 513 and generates dynamic object detections (e.g., detections of moving objects, including their path, speed, rotation, etc.). The sensor fusion/RWM module 530 also includes an occupancy grid manager module 535 that includes a dynamic object filter module 536 and an occupancy grid update module 537. The occupancy grid manager module 535 receives the information about the static objects 514 and the drivable space 516 from the perception interface 510 and the occupancy grid update module 537 updates the occupancy grid information (e.g., which grid boxes are occupied and which are open). Finally, the sensor fusion/RWM module 530 includes a 3D parametric object management module 538 and a base path generation module 539 that receive as input information about the road geometry 518 and HD maps 520 (e.g., map(s) 202), respectively, and outputs base paths (e.g., the center-of-the-lane path that the host vehicle and/or nearby objects are expected to follow).

The sensor fusion architecture 500 also includes a positioning engine 550 (e.g., a GPS, motion sensors (e.g., accelerometer, gyroscope, etc.), etc.) and a transform tree module 560 that provide further inputs to the sensor fusion/RWM module 530. For example, a "sensor coordinate frame" (e.g., a camera coordinate frame, a radar coordinate frame, etc.) as used herein refers to a coordinate system with an origin at the sensor's current position and orientation along the sensor's current axes.

The sensor fusion/RWM module 530 outputs the dynamic object detections, occupancy grid, and base paths to a planner module 540 of the sensor fusion architecture 500. The planner module 540 includes a behavior planner module 542 and a motion planner module 544 that direct other systems (e.g., braking, accelerations, steering, cruise control, signaling, etc.) of the host vehicle (e.g., vehicle 100 of FIGS. 1 and 2) to act (e.g., brake, accelerate, change lanes, etc.) based on the information about the dynamic objects, the occupancy grid, and the base paths received from the sensor fusion/RWM module 530. The sensor fusion/RWM module 530 also outputs to a visualization interface 570. The visualization interface 570 may be connected to a display (e.g., light emitting diode (LED) display, liquid crystal display (LCD), etc., not shown) within the host vehicle (e.g., vehicle 100), such as on the dashboard or behind the steering wheel, to provide information to a driver or occupant within the vehicle.

Although the sensor fusion architecture 500 shown in FIG. 5 is primarily directed to reacting to events (e.g., other vehicles changing lanes, turning onto the roadway, braking, etc.) that may occur while the vehicle is driving, as will be appreciated, the sensor fusion architecture 500 may also receive input from a driver of the vehicle (e.g., direction to change lanes, turn, etc.) and act on those instructions based on the information generated by the sensor fusion/RWM module 530. For example, in the case of an instruction to change lanes, the sensor fusion architecture 500 may first determine that there is a lane to change into and that there are no objects (e.g., vehicles, pedestrians, road signs, etc.) in it before the planner module 540 directs the vehicle to change lanes as instructed.

Figure 6:
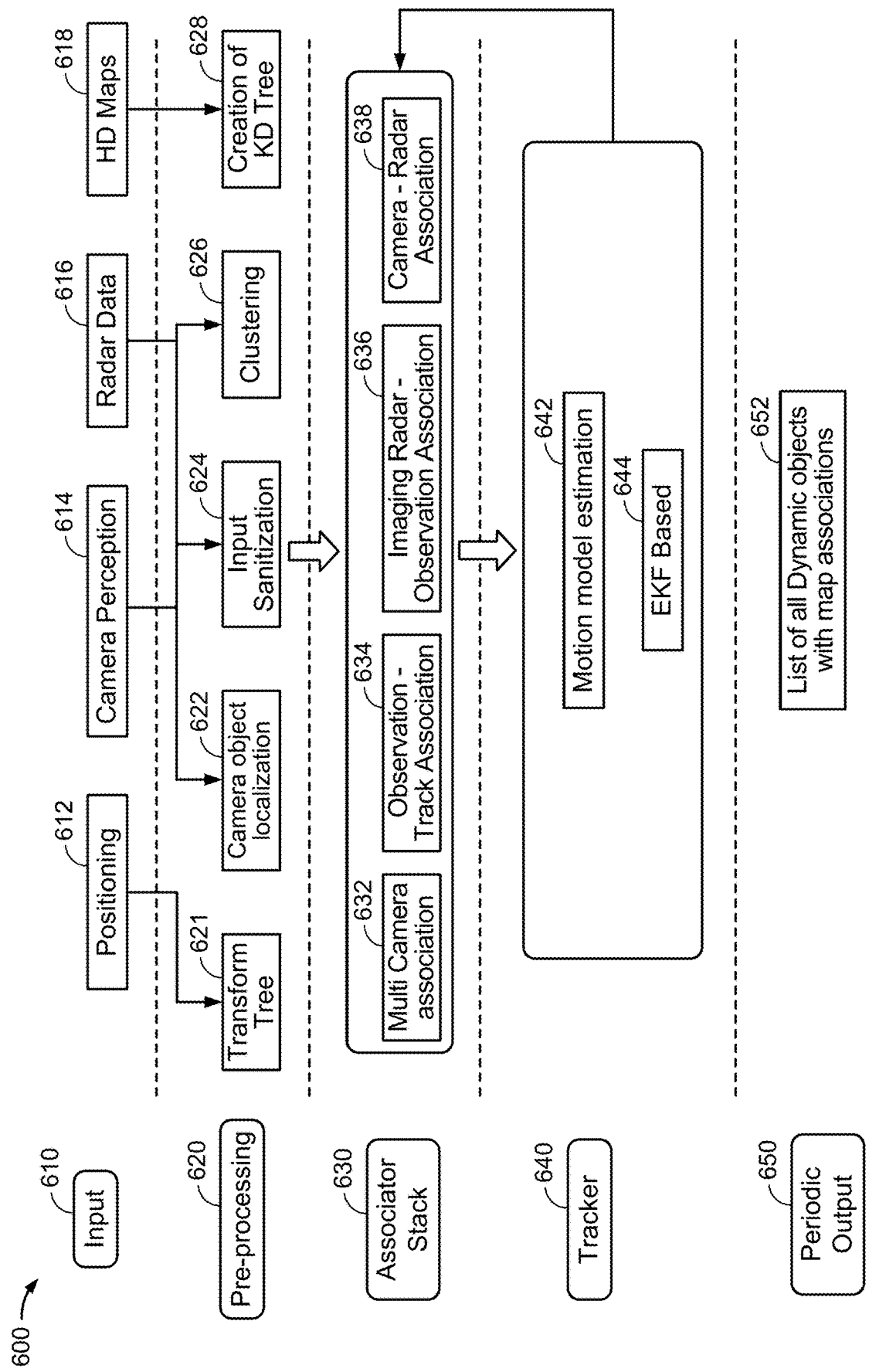
FIG. 6 illustrates an exemplary object tracking architecture, according to aspects of the disclosure.

FIG. 6 illustrates an exemplary object tracking architecture 600, according to aspects of the disclosure. In an aspect, the object tracking architecture 600 may be implemented by the radar-camera sensor module 120 and/or the OBC 200 of FIG. 2, and more specifically, the dynamic object tracking module 531 of the sensor fusion/RWM module 530 in FIG. 5. At an input stage 610, the object tracking architecture 600 receives as input positioning information 612 (e.g., GPS information), camera perception information 614 (e.g., camera images from camera 212), radar data 616 (e.g., radar frames from radar 214), and HD maps 618 (e.g., HD maps 520 of FIG. 5).

At a pre-processing stage 620, the object tracking architecture 600 creates a transform tree 621 (a binary tree representation of multiple coordinate frames as nodes, and links storing the transformation matrix to move from one coordinate frame to another) from the positioning information 612. The pre-processing stage 620 performs camera object localization 622, input sanitization 624, and clustering 626 operations on the camera perception information 614 and radar data 616. The pre-processing stage 620 uses the HD maps 618 for creation of a k-D tree 628 (a space-partitioning data structure for organizing points in a k-dimensional space).

At an associator stack stage 630 (which performs associations of new observations of target objects with existing tracks associated with those objects), the object tracking architecture 600 generates multi camera associations 632, observation track associations 634, imaging radar observation associations 636, and camera-radar associations 638. At a tracker stage 640, the object tracking architecture 600 performs motion model estimation 642 of a tracked object and an extended Kalman filter (EKF) based solution 644 (discussed further below, and referred to as an "EKF tracker"). Finally, at a periodic output stage 650, the object tracking architecture 600 outputs a list of all dynamic objects with respective map associations 652. This information is then fed to the planner module 540 in FIG. 5.

At the preprocessing stage 620, input data coming into the sensor fusion module (e.g., sensor fusion/RWM module 530) is noisy and needs further preprocessing before it can be sent to the associator stack stage 630 and the estimation pipeline in the sensor fusion module. Accordingly, the present disclosure provides various techniques to sanitize the input data at the input sanitization 624 level. Additionally, some of the inputs are processed to estimate additional quantities that can then be later used in the association and estimation pipeline.

The training of deep learning networks (also referred to as "deep neural networks") for object detection and state estimation based on imaging radar and/or camera input requires large amounts of training data. In the case of generating training data/annotations for camera frames, current techniques are to manually draw bounding boxes on images of cars, trucks, and other vehicles. This is a very labor intensive and relatively expensive work. In the case of imaging radar, generating training data/annotations manually does not seem feasible, as it is difficult for a human to correctly place the bounding box on an imaging radar frame. It can, however, be done indirectly if camera images have been recorded as well and cross calibration transformations (e.g., formula(s) that transform a camera frame and/or a radar frame such that the two sensors appear to have the same location and orientation, and the two frames have the same sensor coordinate frame—cross calibration is captured in six parameters, translation in x, y, and z axes and rotation around x, y, and z axes) between the camera and radar sensors are available.

Camera, radar, and LiDAR have different strengths and weaknesses as sensors. While LiDAR is currently used on autonomous or semi-autonomous vehicles, the goal is to equip vehicles with cameras and radars alone. However, the main advantage of LiDAR over a camera and/or radar is that it provides depth and geometric information. A camera provides azimuth and elevation information, but is poor at providing depth and orientation information, especially at greater distances. It is, however, human-interpretable. Radar provides azimuth, depth, and velocity information, but is poor at providing orientation and size information. Raw imagining radar output is also hard for humans to interpret. LiDAR provides 3D information in the form of a point cloud.

It would be beneficial to automatically annotate large amounts of camera and/or radar data using LiDAR data. These annotations could then be used to train the deep learning networks to perform object detection in camera and radar frames, which would outperform traditional camera and/or radar training methods because, as noted above, manual annotation is slow, expensive, and sometimes difficult.

Accordingly, the present disclosure provides techniques to use LiDAR data to annotate object detections in camera and radar frames captured by a test (ego) vehicle while, for example, the test vehicle is driving down a freeway. The test vehicle is expected to have, in addition to the LiDAR sensor and a high quality GPS sensor for positioning, at least one imaging radar sensor and multiple camera sensors (note that the test vehicle may have enough radar and camera sensors to capture a 360 degree view around the vehicle). In addition, the cross calibration between the LiDAR sensor, the imaging radar, and the cameras is assumed to be known. Because of the cross calibration between the sensors, the bounding boxes around the objects detected in a LiDAR frame can be projected onto the corresponding radar frame and camera frames to generate annotations that can be used to train the respective deep learning networks. In addition to the bounding boxes (which provide the position and dimensions of the detected object(s)), the speed and heading of target objects can also be shared for training.

Ideally, the generated annotations would be of sufficiently high quality that they could be used for training "as is." However, if they are not, the generated annotations could still be used, just with some imperfections that would be fixed manually. This would still be much more efficient than manually annotating a data set of camera and radar frames from scratch.

Figure 7:
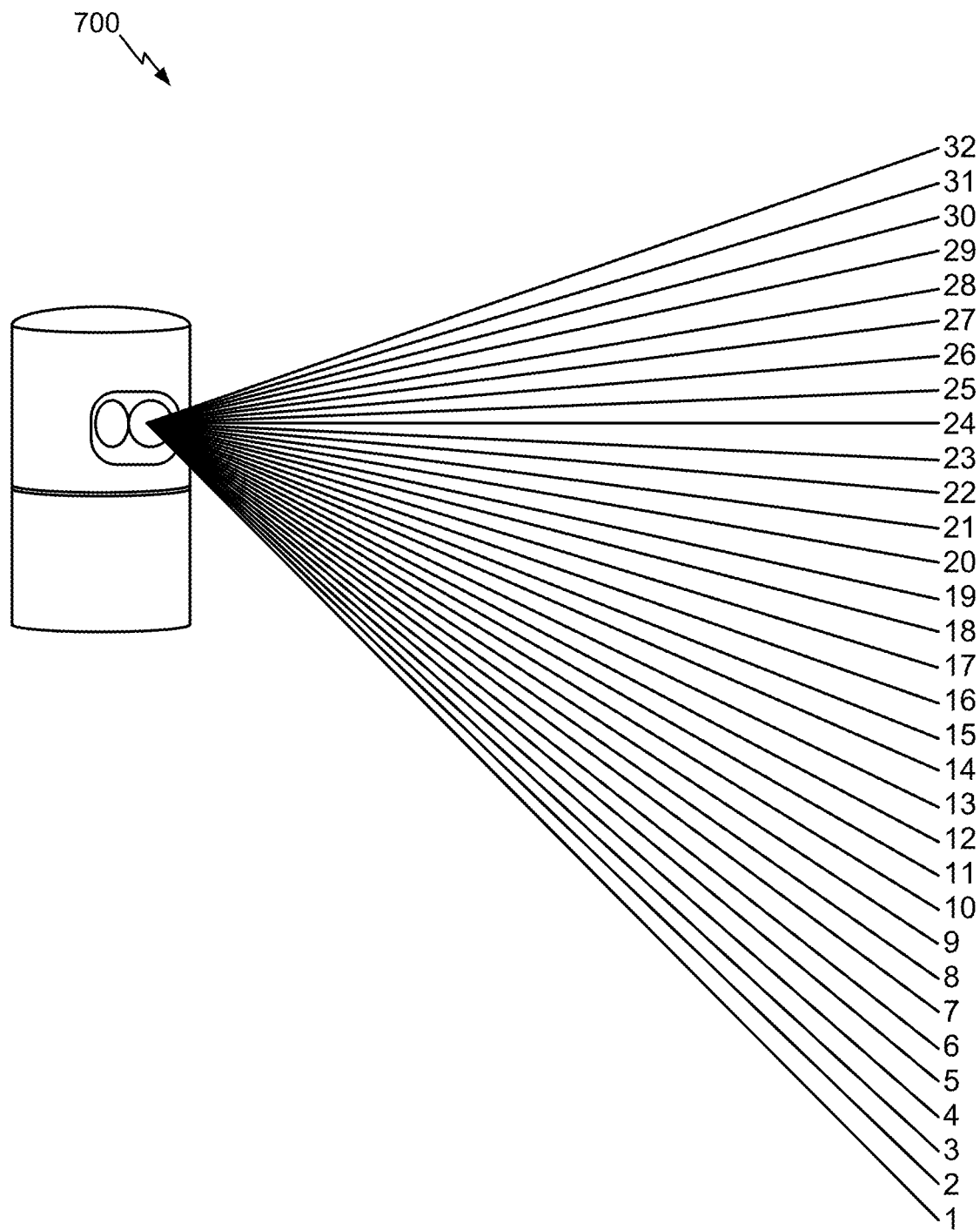
FIG. 7 illustrates an exemplary LiDAR sensor mounted in a rotatable housing, according to aspects of the disclosure.

FIG. 7 illustrates an exemplary LiDAR sensor 700 (which may correspond to LiDAR sensor 216) mounted in a rotatable housing, according to aspects of the disclosure. The LiDAR frame of reference is centered at the LiDAR sensor 700 with the x-axis pointing to the right, the y-axis pointing forward, and the z-axis pointing vertically upward. The LiDAR sensor 700 may emit lasers vertically along 32 lines (i.e., directions) of measurement at a frame rate of 10 Hz (i.e., 10 times per second). The 32 lines of measurement may be within a +10 to −30 degree vertical field of view (FOV), meaning there is a 1.33 degree separation between lines. The lasers may be emitted sequentially or in an interleaving pattern, such as 1, 17, 2, 18, 3, 19, etc.

The LiDAR sensor 700 may rotate 360 degrees horizontally around the z-axis (the horizontal FOV), with the lasers firing once for every 0.15 degrees of revolution (referred to as ticks). The reflections from the lasers are used in the LiDAR firmware to compute the distance to each object detected in the scene along each direction of measurement. A single revolution of the LiDAR sensor 700 may take 100 ms and provide on the order of 360 degrees divided by 0.15 times 32 distance measurements, or approximately 70,000 distance measurements. For processing, LiDAR data is processed one revolution at a time. The information collected in one revolution is referred to as a LiDAR frame. Thus, there may be up to 70,000 points per LiDAR frame. However, as will be appreciated, there may not be returns for each point.

Figure 8A:
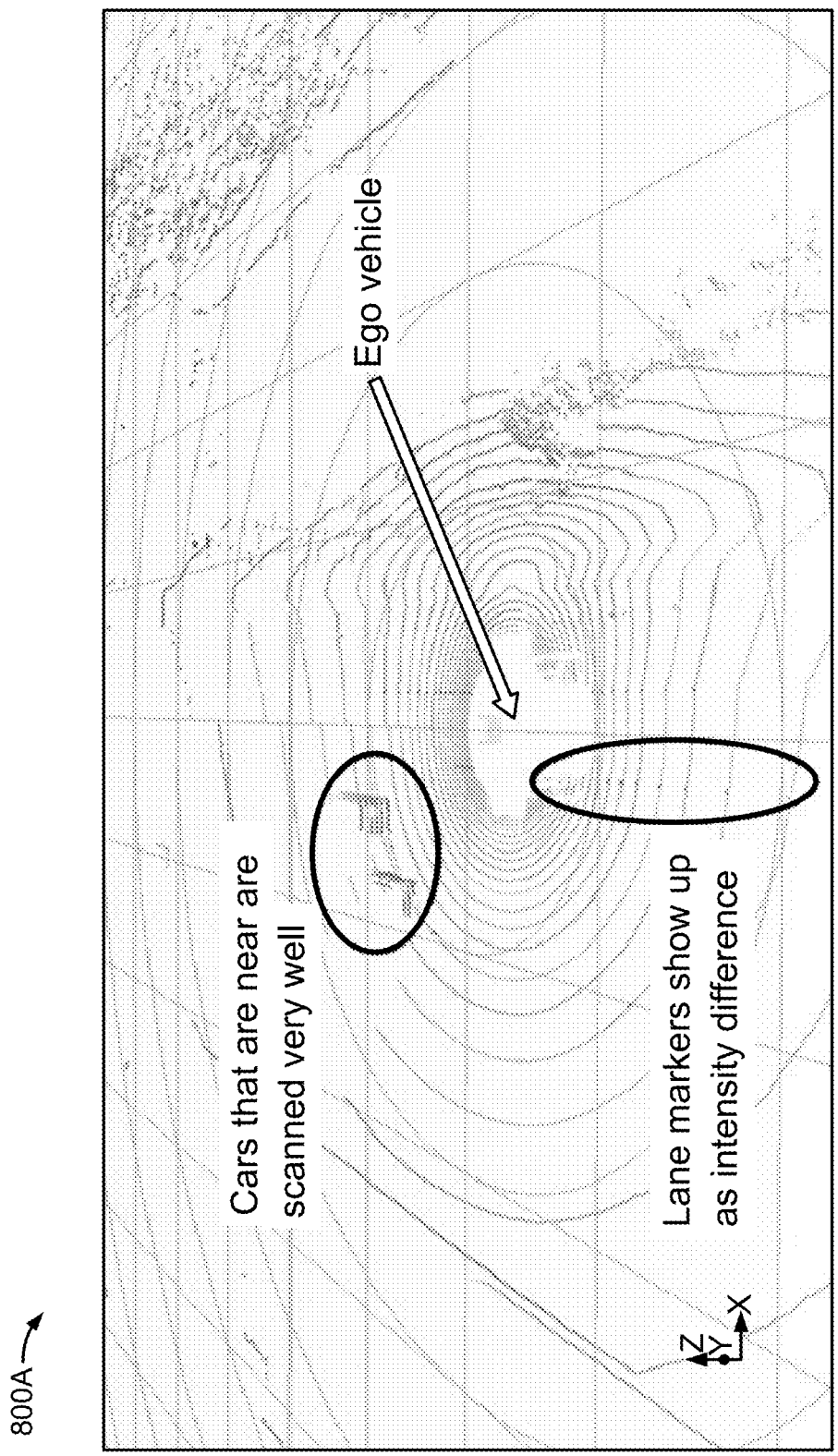
FIGS. 8A and 8B illustrate exemplary LiDAR frames captured at a first time step and a second time step, according to aspects of the disclosure.
Figure 8B:
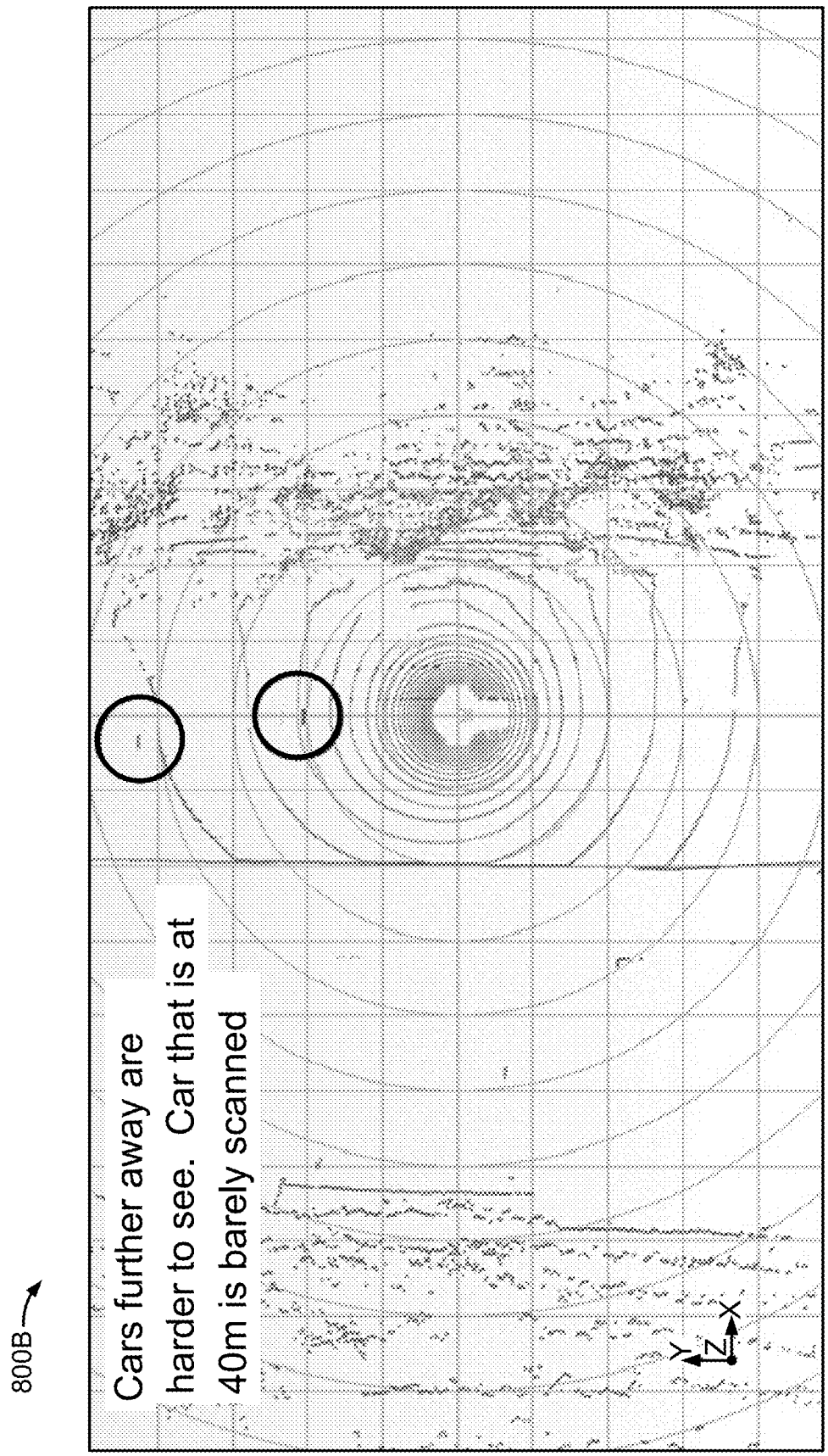

The range of a LiDAR sensor (e.g., LiDAR sensor 700) is around 80 to 100 m, but the point cloud density decreases significantly with distance. FIGS. 8A and 8B illustrate exemplary LiDAR frames 800A and 800B, respectively, captured at two different time steps, according to aspects of the disclosure. The circular lines are ground returns. There are two objects (e.g., vehicles) in front of the ego vehicle traveling in the same direction as the ego vehicle. As can be seen in the center of the LiDAR frames 800A and 800B, there is a blind spot created by the ego vehicle surrounding returns from its roof. Slopes and shrubbery on the right are visible, as is the guard rail on the left. Note that the spacing of the LiDAR lines increases rapidly the further away from the center, and correspondingly, the number of LiDAR returns from far away objects also decreases. Note also the intensity difference on the lane markers versus on unmarked ground.

As illustrated in FIG. 8A, detected objects (e.g., vehicles) that are near the ego vehicle are scanned very well. However, as illustrated in FIG. 8B, which is captured 7.3 seconds, or 73 frames (i.e., revolutions), after LiDAR frame 800A, the detected objects (e.g., vehicles), now further from the ego vehicle, are harder for the LiDAR sensor to "see."

Figure 8C:
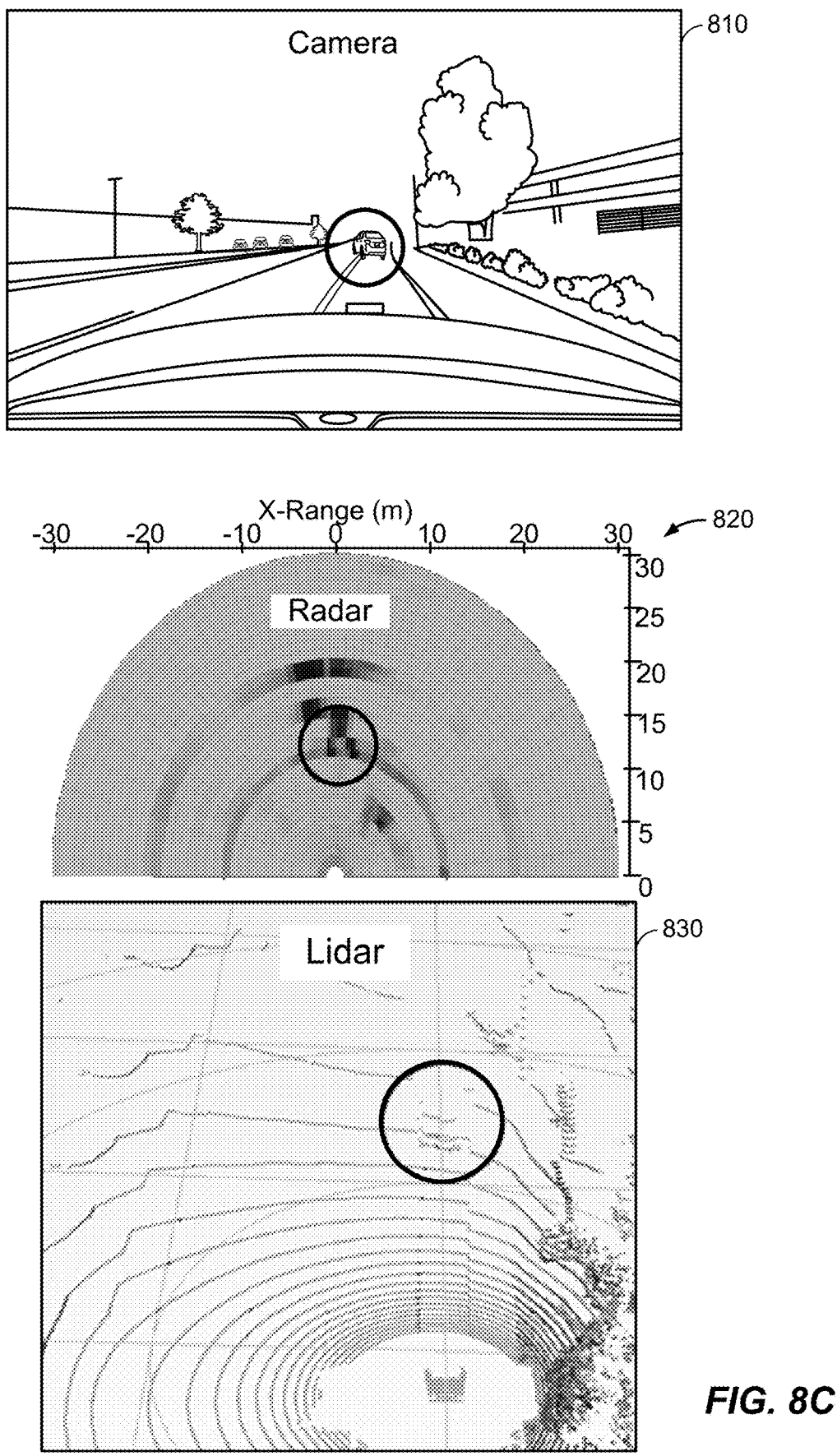
FIG. 8C illustrates a comparison between a camera frame, a radar frame, and a LiDAR frame, according to aspects of the disclosure.

FIG. 8C illustrates a comparison between a camera frame 810, a radar frame 820, and a LiDAR frame 830, according to aspects of the disclosure. Specifically, the same object has been detected in each frame, and FIG. 8C shows the difference of how that object is represented in each frame.

LiDAR data can be used to obtain the size, position, and yaw information (i.e., the oriented bounding box or OBB) for observed objects (e.g., vehicles). This information can then be used to annotate some large number of radar frames, and the annotated radar frames can be used to train a deep neural network (DNN) to infer this information directly from the radar frames. Training a DNN to infer this information from the radar frames themselves eliminates the need for OBB information from the LiDAR sensor after the DNN is trained.

Similarly, the LiDAR OBB information can be used to annotate a large number of camera frames. Currently, deep learning techniques provide two-dimensional (2D) bounding boxes for detected objects. Using the techniques described herein, a DNN can instead be trained to provide 3D OBBs.

Figure 9:
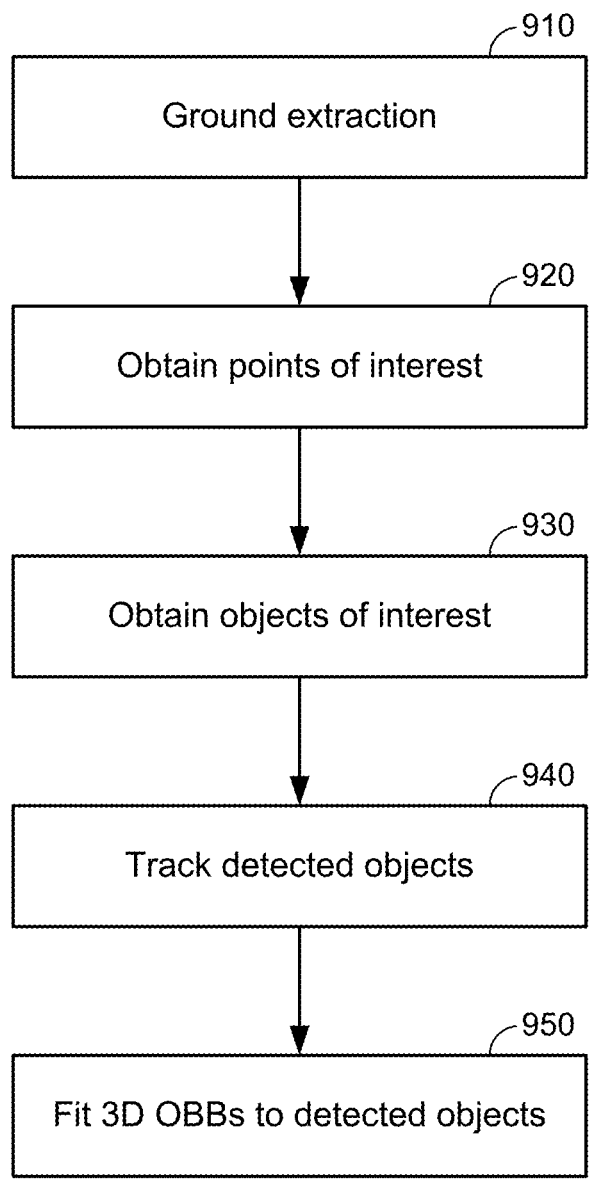
FIG. 9 is an exemplary method illustrating the sequence of operations for using LiDAR data to generate annotations, according to aspects of the disclosure.

FIG. 9 is a method 900 illustrating the sequence of operations for using LiDAR data to generate annotations, according to aspects of the disclosure. The first stage 910 of processing LiDAR data, regardless of the annotation goal (e.g., identifying nearby vehicles), is ground extraction from the LiDAR point cloud. This is because the removal of ground points is needed before objects of interest (e.g., vehicles) can be identified. The second stage 920 is to obtain LiDAR points of interest. The third stage 930 is to segment the chosen LiDAR points to obtain an object of interest. The fourth stage 940 is to track detected objects across frames. The fifth stage is to fit 3D OBBs to the objects (e.g., vehicles) detected in the camera/radar frames.

Figure 10:
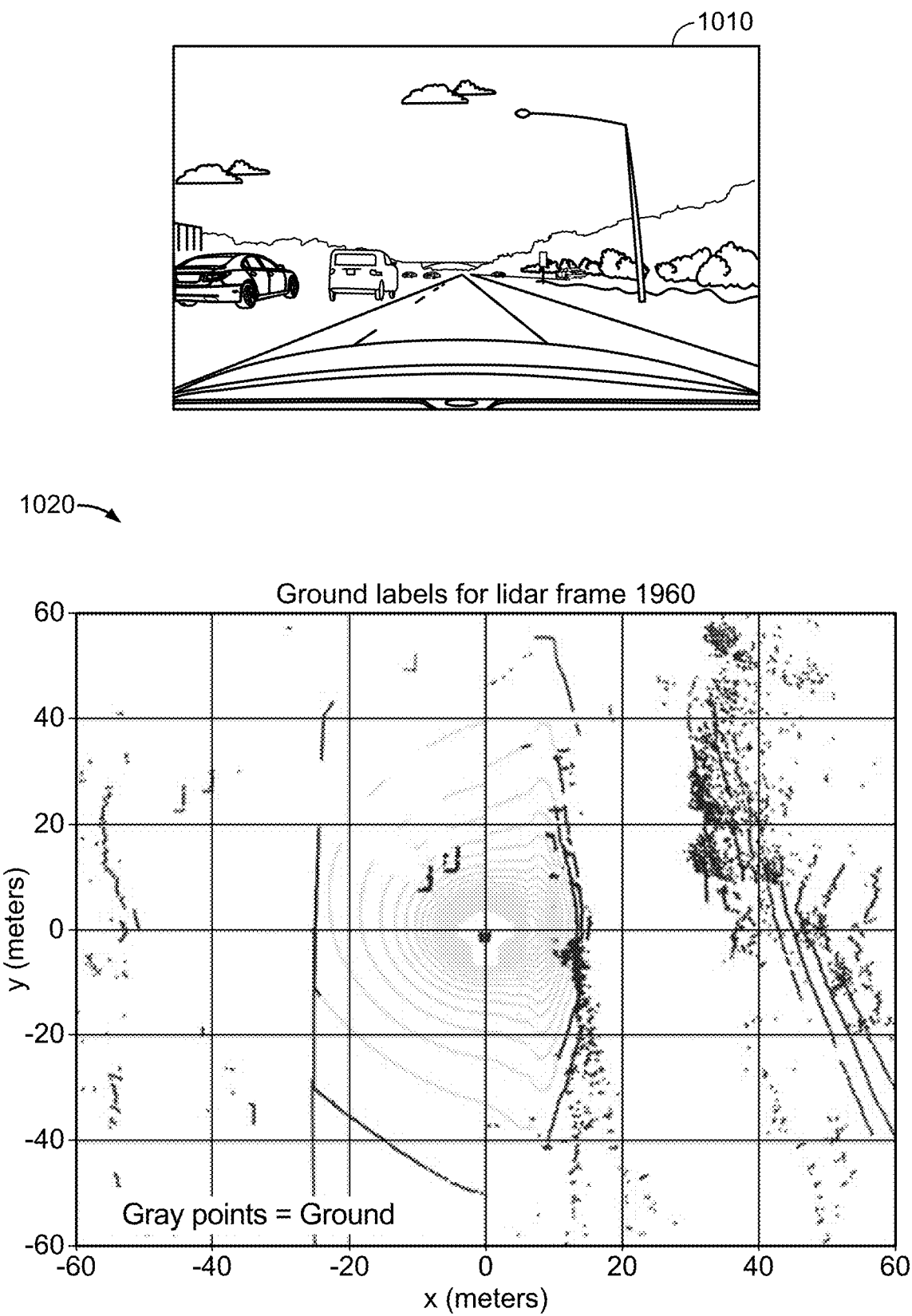
FIG. 10 illustrates a comparison of a camera frame and a LiDAR frame, in which ground points and non-ground points in the LiDAR frame have been identified, according to aspects of the disclosure.

With reference to stage 910 of FIG. 9, FIG. 10 illustrates a comparison of a camera frame 1010 and a LiDAR frame 1020, in which ground points and non-ground points in the LiDAR frame 1020 have been identified. In the example of FIG. 10, the camera frame 1010 and the LiDAR frame 1020 have been captured at the same point in time.

The ground extraction method begins by creating a mesh of all LiDAR points, with each point from the point cloud acting as a node in the mesh. In creating the mesh, the nearest neighbors on the same laser contour and adjacent laser contours are identified. More specifically, the nodes (i.e., points) are first traversed along laser contours. Nearest neighbors to either side of each node on the contour that are within a distance tolerance are added as left and right neighbors. Nodes are then traversed radially outward starting from the innermost contour and up and down neighbors are again defined similarly for each node on adjacent contours within a distance threshold. In general, every node has a left neighbor, right neighbor, up neighbor, and down neighbor unless there are no nodes within the distance threshold in one of the directions.

Next, once the mesh is created, the surface gradients of the z coordinate are estimated at each point and points with gradients below a threshold are considered ground candidates. Finally, the ground region is identified locally in the inner laser contour and is grown outward from the first contours across the mesh by labeling a point as a ground point if it has gradient below the gradient threshold and it has a neighboring ground point with a z coordinate that is within a pre-specified z threshold of its own z coordinate. As shown in FIG. 10, the ground points are in gray and form concentric rings around the ego vehicle. At the end of this operation, each point in the LiDAR point cloud is labeled either ground or occupied. The occupied points are considered for object segmentation while the ground points are considered for lane marker detection.

Figure 11:
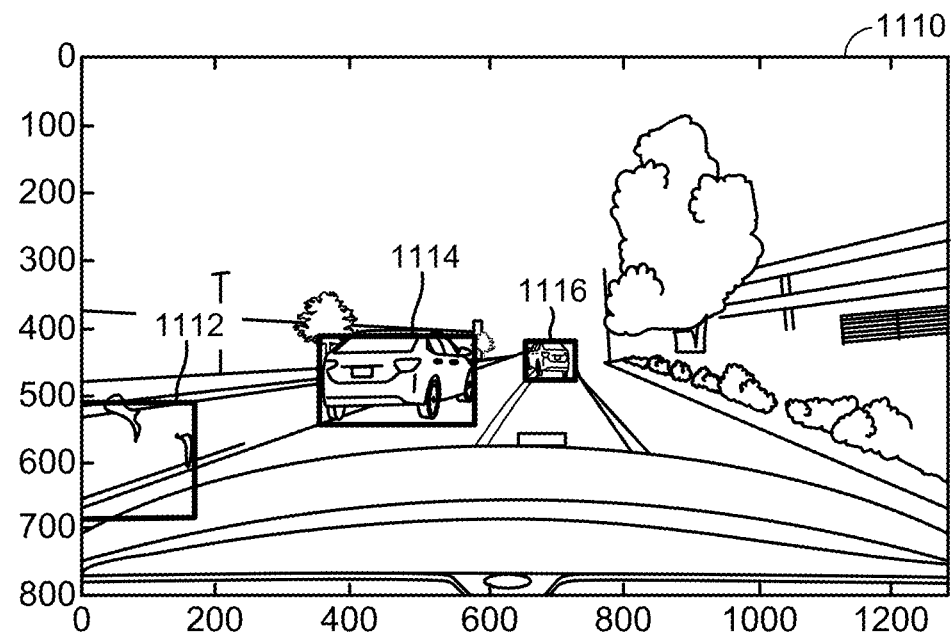
FIG. 11 illustrates a camera frame and a camera projection frame, according to aspects of the disclosure.
Figure 11:
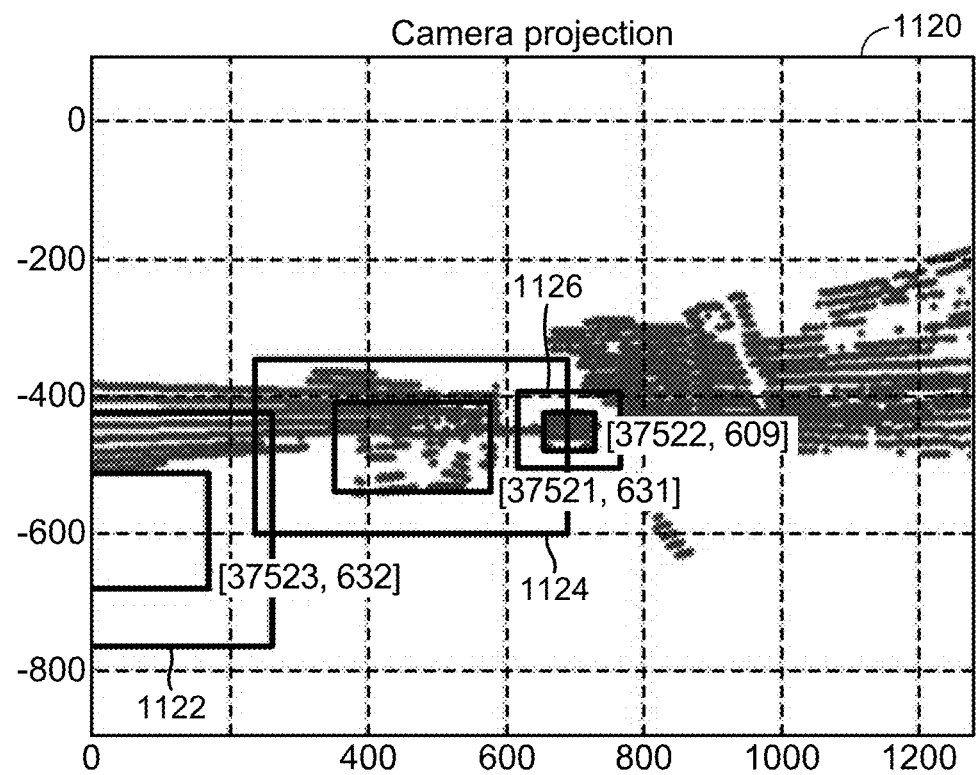

Referring now to stage 920 of FIG. 9, FIG. 11 illustrates a camera frame 1110 and a camera projection frame 1120. In the camera frame 1110, three 2D bounding boxes 1112-1116 (2D OBBs) have been identified by a vertex-SSD (single-shot detector) based vehicle detector. Note that in the example of FIG. 11, bounding box 1112 has falsely identified a vehicle. In the camera projection frame 1120, non-ground LiDAR points have been projected onto the image plane. Using (enlarged versions of) the same bounding boxes from the camera frame 1110, illustrated as 2D bounding boxes 1122-1126, LiDAR points of interest (i.e., LiDAR points corresponding to the 2D bounding boxes in the camera frame 1110) are identified. Note that LiDAR points from the background may also get picked up in the 2D bounding boxes 1122-1126.

Figure 12:
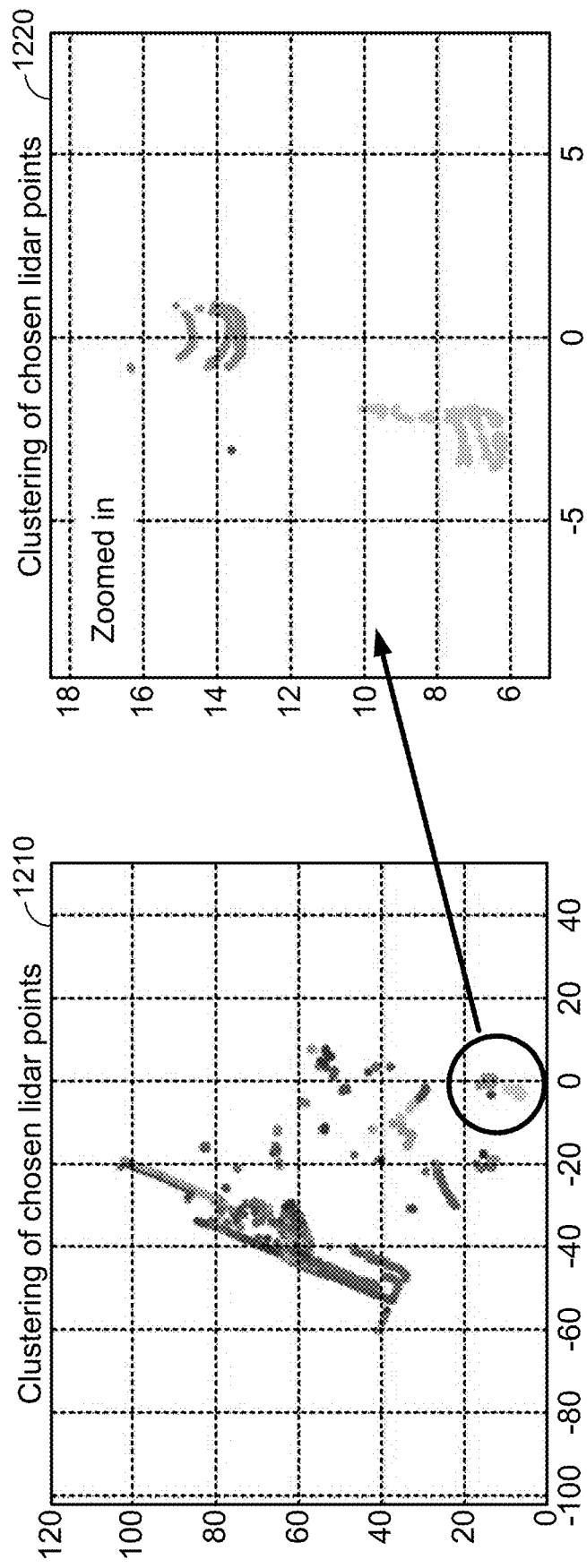
FIG. 12 illustrates an adjacency graph derived from the camera projection frame of FIG. 11 and a zoomed-in adjacency graph, according to aspects of the disclosure.

Referring to stage 930 of FIG. 9, FIG. 12 illustrates an adjacency graph 1210 derived from the camera projection frame 1120 of FIG. 11 and a zoomed-in adjacency graph 1220 of the adjacency graph 1210, according to aspects of the disclosure. At this stage, the LiDAR points of interest are segmented into objects by creating the voxel-based adjacency graph 1210 and finding connected components. In a voxel-based approach, the space is carved into voxels as follows. Consider an axis aligned grid in X, Y, and Z dimensions, and the voxels created by that. If the grid lines had identical and uniform spacing in each dimension, each voxel would be a perfect cube. In general, the spacing may be neither identical nor uniform, so the voxels are cuboids. In any case, note that each cuboid has 26 neighbors, if the adjacent cuboids in each dimension and also along the diagonals, i.e., all cuboids that share a face, edge, or corner with that cuboid, are considered as neighbors. Each non-ground, non-transition LiDAR point is assigned to the cuboid within which it lies. All empty cuboids are discarded, and an edge is drawn between two occupied cuboids if they are neighbors. Thus, an undirected graph is obtained. Connected components (a subgraph in which any two vertices are connected to each other by paths, and which is connected to no additional vertices in the supergraph) of this graph are obtained, and each connected component is considered to represent an independent object. All of the LiDAR points assigned to the voxels of the connected component are together the point cloud for that object.

After segmentation, the correct object needs to be identified. This is done by finding the objects that have the most points inside their respective 2D bounding boxes (e.g., 2D bounding boxes 1122-1126).

Figure 13:
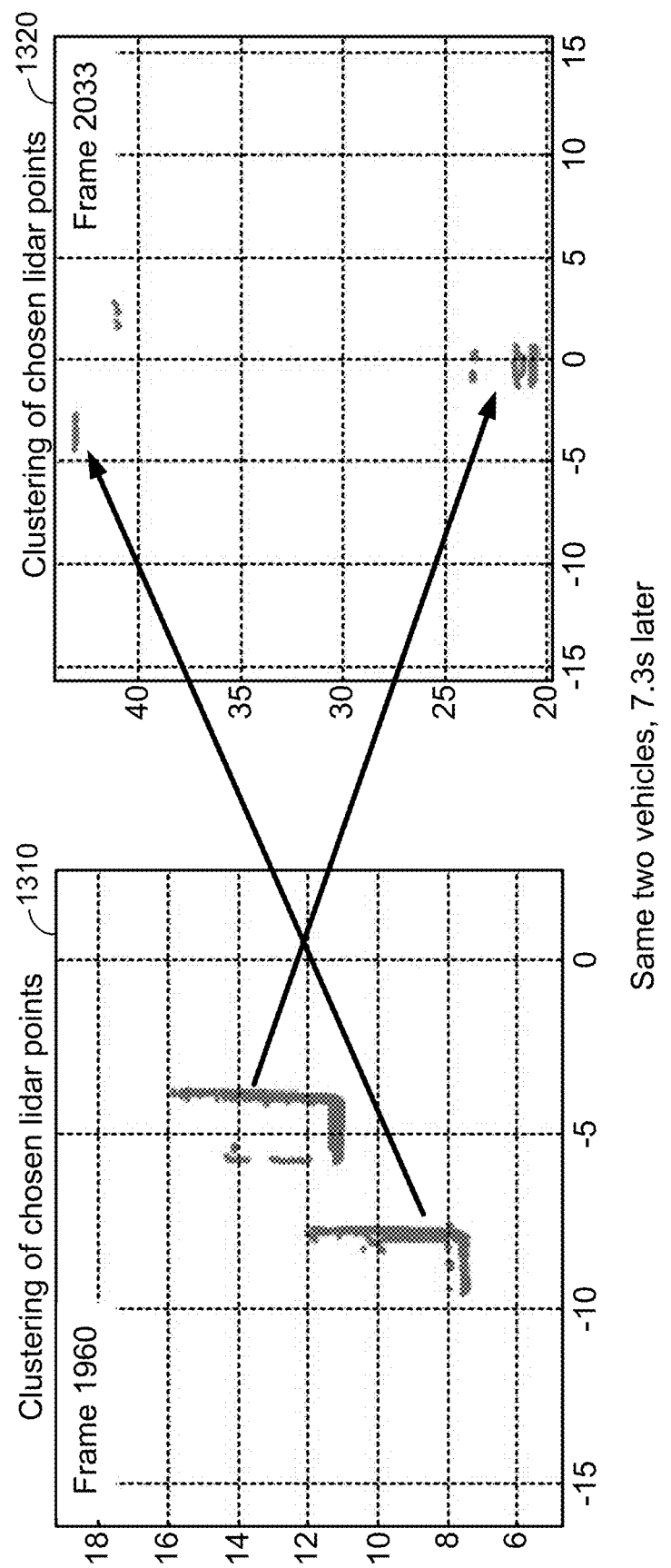
FIG. 13 illustrates an adjacency graph at a first time step and an adjacency graph at a second time step, according to aspects of the disclosure.

Referring to stage 940 of FIG. 9, FIG. 13 illustrates an adjacency graph 1310 at a first time step (frame 1960) and an adjacency graph 1320 at a second time step (frame 2033), according to aspects of the disclosure. Camera based tracking can be used to associate objects (e.g., vehicles 130/140) across frames (e.g., frames 1960 and 2033). The dimensions of an object (e.g., a vehicle) can be estimated when the object is near the ego vehicle and the LiDAR scan is good. Those dimensions can then be used in all subsequent frames containing the detected object. FIG. 13 illustrates the difference in the number of LiDAR points associated with the same two detected vehicles at a first time step (adjacency graph 1310) and a second time step 7.3 seconds later (adjacency graph 1320). As shown, there are many fewer LiDAR points associated with the two target vehicles in the second adjacency graph 1320 (frame 2033), where the target vehicles are further from the ego vehicle, than there are in the first adjacency graph 1310 (frame 1960), where the target vehicles are close to the ego vehicle. As such, it is beneficial to use the dimensions of the target vehicles calculated from the adjacency graph 1310.

Figure 14:
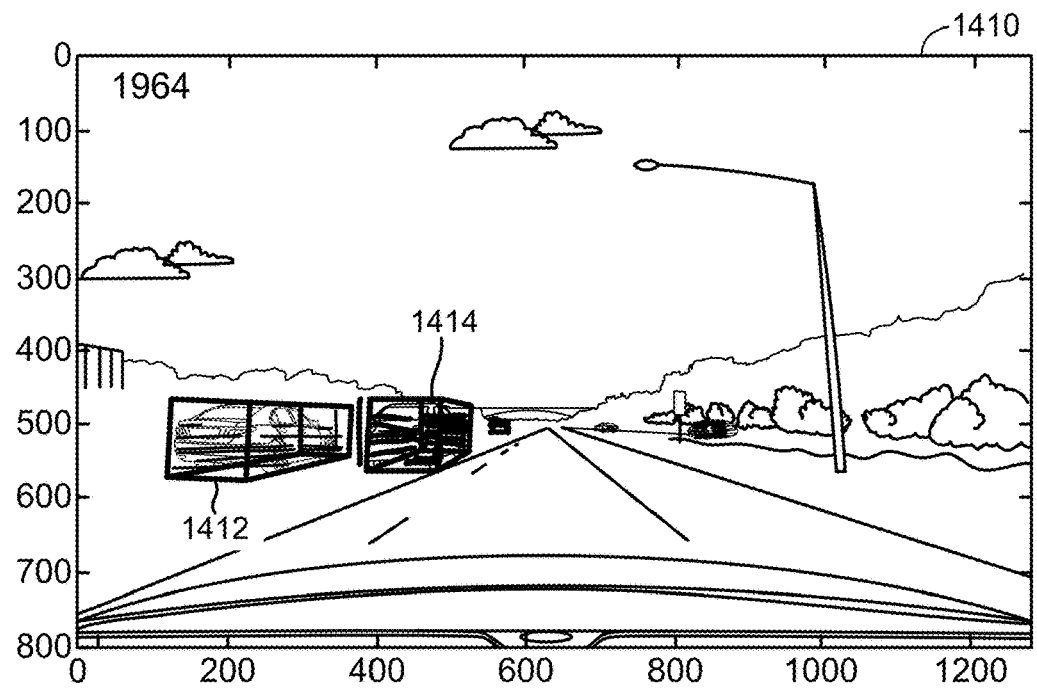
FIG. 14 illustrates a camera frame and the corresponding LiDAR frame, according to aspects of the disclosure.
Figure 14:
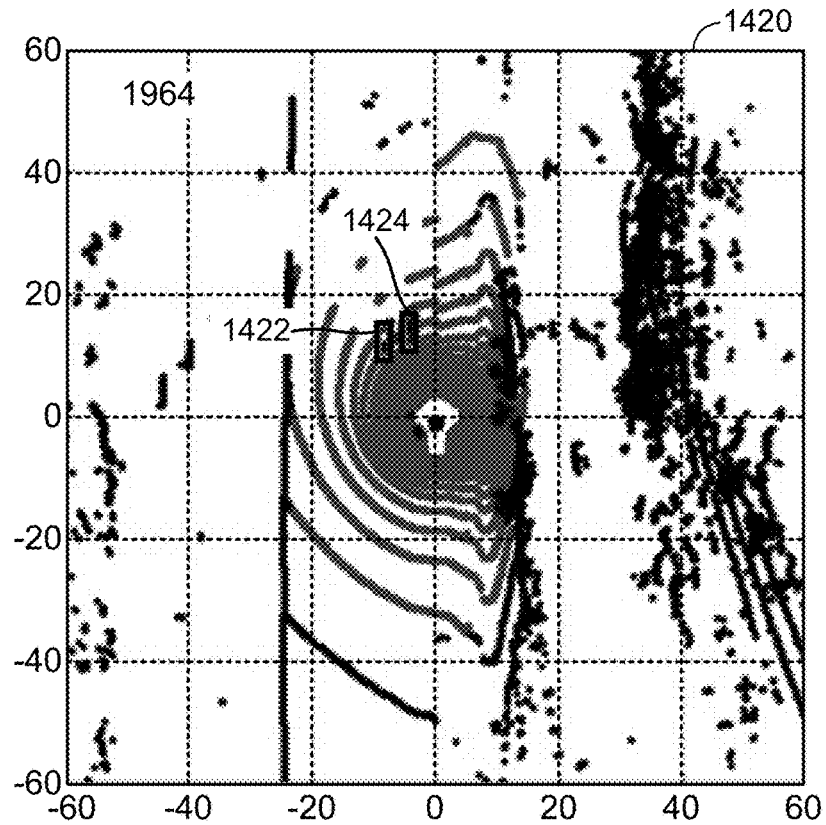

Referring to stage 950 of FIG. 9, 3D OBBs can now be fitted to the observed/detected objects (e.g., vehicles). FIG. 14 illustrates a camera frame 1410 and the corresponding LiDAR frame 1420, according to aspects of the disclosure. In the example of FIG. 14, two objects (e.g., vehicles 130/140) have been detected and identified by bounding boxes 1422 and 1424 using the stages of the disclosed algorithm (i.e., method 900) described above. Based on these detections, the camera frame 1410 can be annotated with 3D OBBs 1412 and 1414, which correspond to bounding boxes 1422 and 1424, respectively.

Although not described in detail herein, the disclosed annotation technique can be applied to radar frames in the same way as described with reference to camera frames. Once annotated, the annotated camera and radar frames can be used to train a DNN that detects objects in camera and radar frames. Once trained, the DNN should be able to detect/identify objects in camera and radar frames without needing assistance (i.e., the annotations) from LiDAR data, thereby rendering the LiDAR sensor unnecessary.

Figure 15:
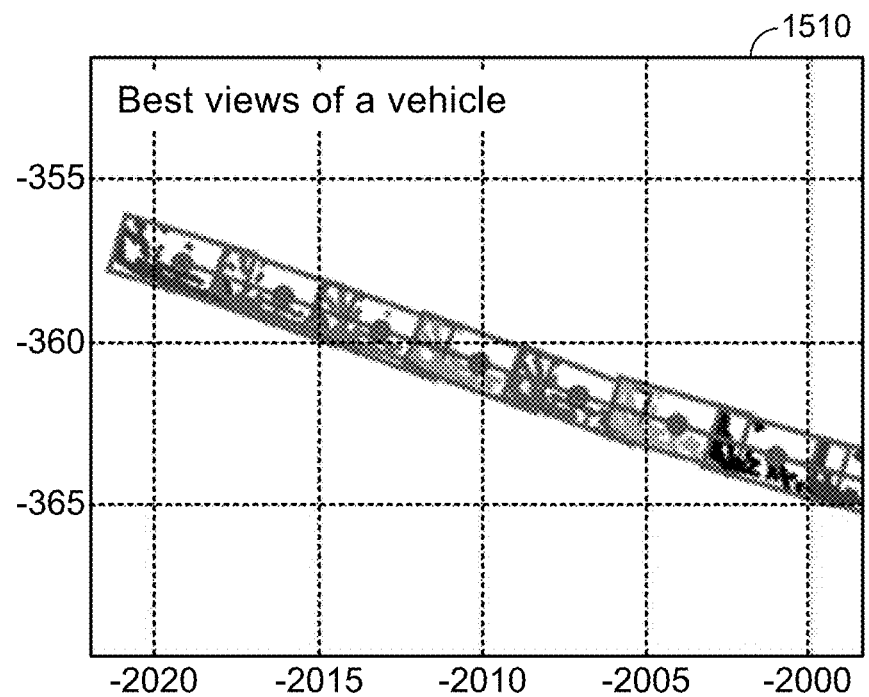
FIG. 15 illustrates an exemplary adjacency graph for a first LiDAR frame captured at a first time step and an exemplary adjacency graph for a second LiDAR frame captured at a second time step, according to aspects of the disclosure.
Figure 15:
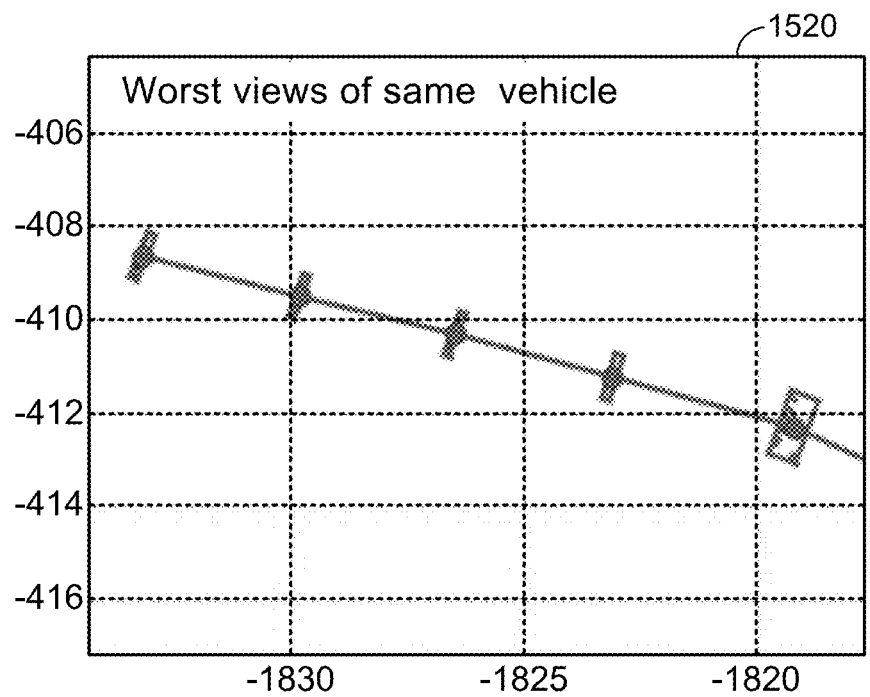

There are various challenges that should be considered in the above-disclosed algorithm (i.e., method 900 of FIG. 9), such as the intricacies of tracking vehicles as their range relative to the ego vehicle increases and the corresponding point clouds become more sparse. Even if the algorithm calculates a good dimension estimate of a vehicle (i.e., a 3D OBB), accurately estimating the correct location of the OBB for a vehicle far away with a correspondingly sparse point cloud is an ongoing challenge. FIG. 15 illustrates an exemplary adjacency graph 1510 for a first LiDAR frame captured at a first time step and an exemplary adjacency graph 1520 for a second LiDAR frame captured at a second time step, according to aspects of the disclosure. In FIG. 15, the x-y axes represent coordinates in the East-North-Up (ENU) frame with respect to a reference base station. Specifically, the x axis corresponds to East and the y axis corresponds to North. Since the ego vehicle will have GPS, it is straightforward to transform the LiDAR point cloud from the LiDAR coordinate frame to an ENU coordinate frame.

As shown in FIG. 15, there are many more LiDAR points associated with the best view of a vehicle (obtained when the object is nearby), as shown in adjacency graph 1510, versus the worst view of the same vehicle (obtained when the object is far away), as shown in adjacency graph 1520. The disclosed techniques attempt to estimate which corner of the vehicle is being sensed the best, and match the corner of the correct-sized bounding box to that corner. In addition, trajectory smoothing, outlier rejection, and various yaw estimation methods can be performed in the current algorithm.

The disclosed algorithm can fail in some cases. For example, ground removal may not be perfect at far distances. Specifically, some ground points may be grouped with vehicle points, causing incorrect localization. As another example, for some vehicles, the LiDAR system may never get a good "look" at them, so the estimated dimensions may be wrong. This can be addressed by having size priors. For example, a size prior for a car may be a length of 4.5 m, a width of 1.7 m, and a height of 1.6 m. If a car in front of the ego vehicle moves into range but then accelerates out of LiDAR range, the LiDAR sensor may only detect the back of it. However, if the height does not exceed 2 m, for example, the ego vehicle can assume the detected object is a car and apply these size priors. Otherwise, the ego vehicle may determine the object is a truck or something else. As yet another example, tracking can fail at far distances. That is, a tracked object (e.g., vehicle) may be the same object as in a previous frame, but the algorithm may not know it.

To address these issues, more data can be collected and the algorithm and associated parameters can be fine-tuned for, for example, freeway and non-freeway conditions. In addition, an annotation confidence measure can be developed, which would exclude poor frames from the training set, or those frames could be manually annotated.

Figure 16:
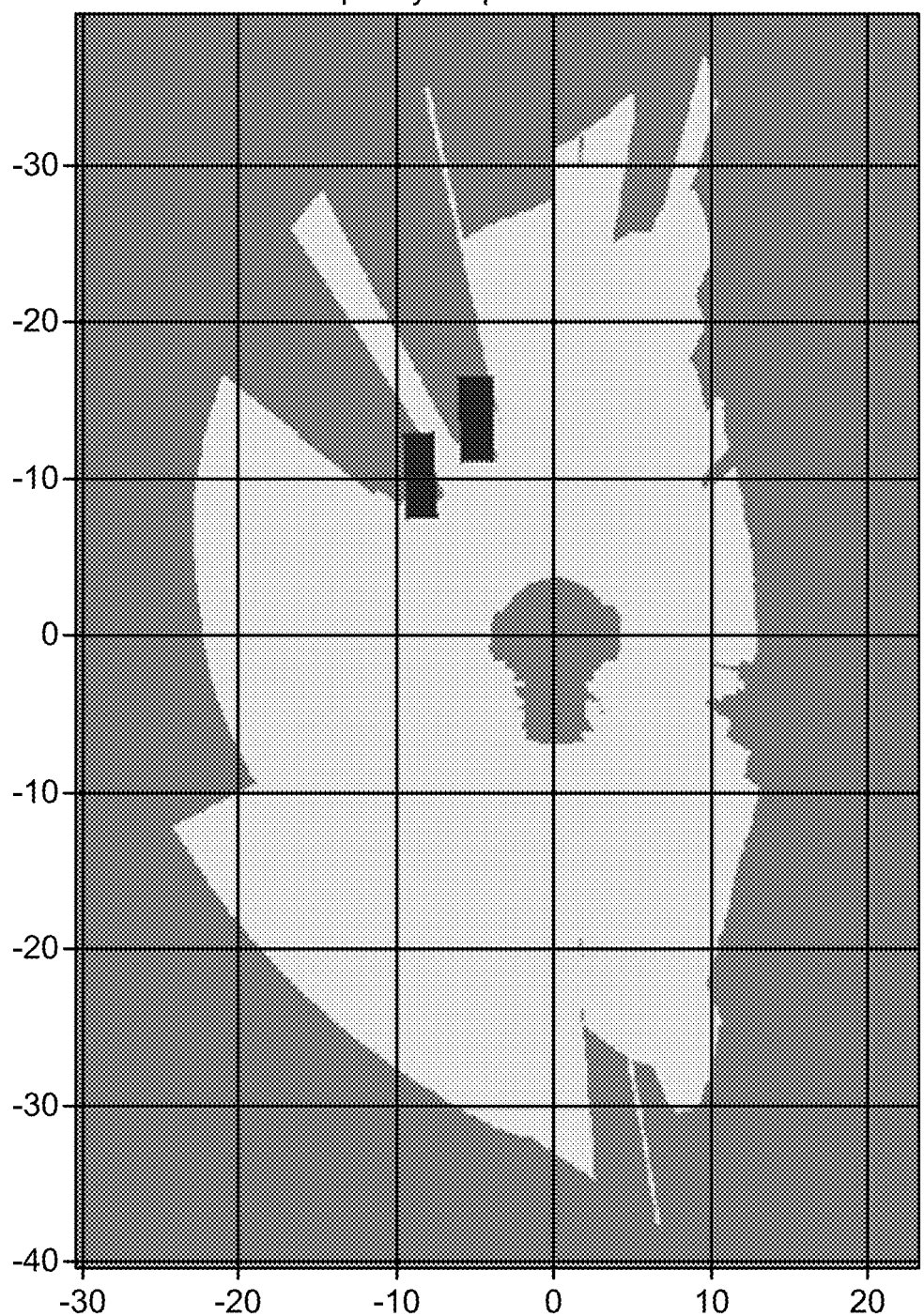
FIG. 16 illustrates an exemplary occupancy map, according to aspects of the disclosure.

In an aspect, an occupancy map can be annotated using the disclosed algorithm (i.e., method 900 of FIG. 9). FIG. 16 illustrates an exemplary occupancy map 1600 at a given time step (frame 1960), according to aspects of the disclosure. The goal is to have the radar and camera sensors infer the occupancy of the environment without assistance from the LiDAR sensor (as future autonomous vehicles will preferably not need to be equipped with LiDAR). As discussed above, the LiDAR sensor can detect the ground and other vehicles. As such, the following labels are possible: (1) label all ground as unoccupied, (2) label target vehicle locations as occupied, and (3) label as unknown the cone beyond the target vehicles. It would also be beneficial to have more detailed labels, such as "drivable space" (e.g., road shoulder versus paved road).

In an aspect, the disclosed algorithm (i.e., method 900 of FIG. 9) may include an additional stage of transition detection. This stage may be performed as part of the first stage 910 of identifying and removing ground points. Specifically, the initial set of ground points (from 910 of FIG. 9) is often not exhaustive, as some true ground points with neighboring points on vehicles tend to be incorrectly classified as non-ground. If all such non-ground points are considered occupied points, this could lead to incorrect object size estimation and object orientation estimation in downstream processing. This is avoided by performing a transition point detection step. This involves traversing along each contour while maintaining a finite length first-in-first-out (FIFO) buffer of ground points encountered along the contour. Any non-ground point on the contour with a z coordinate that is within the z-threshold of the median buffer value is labeled as a transition point.

Figure 17:
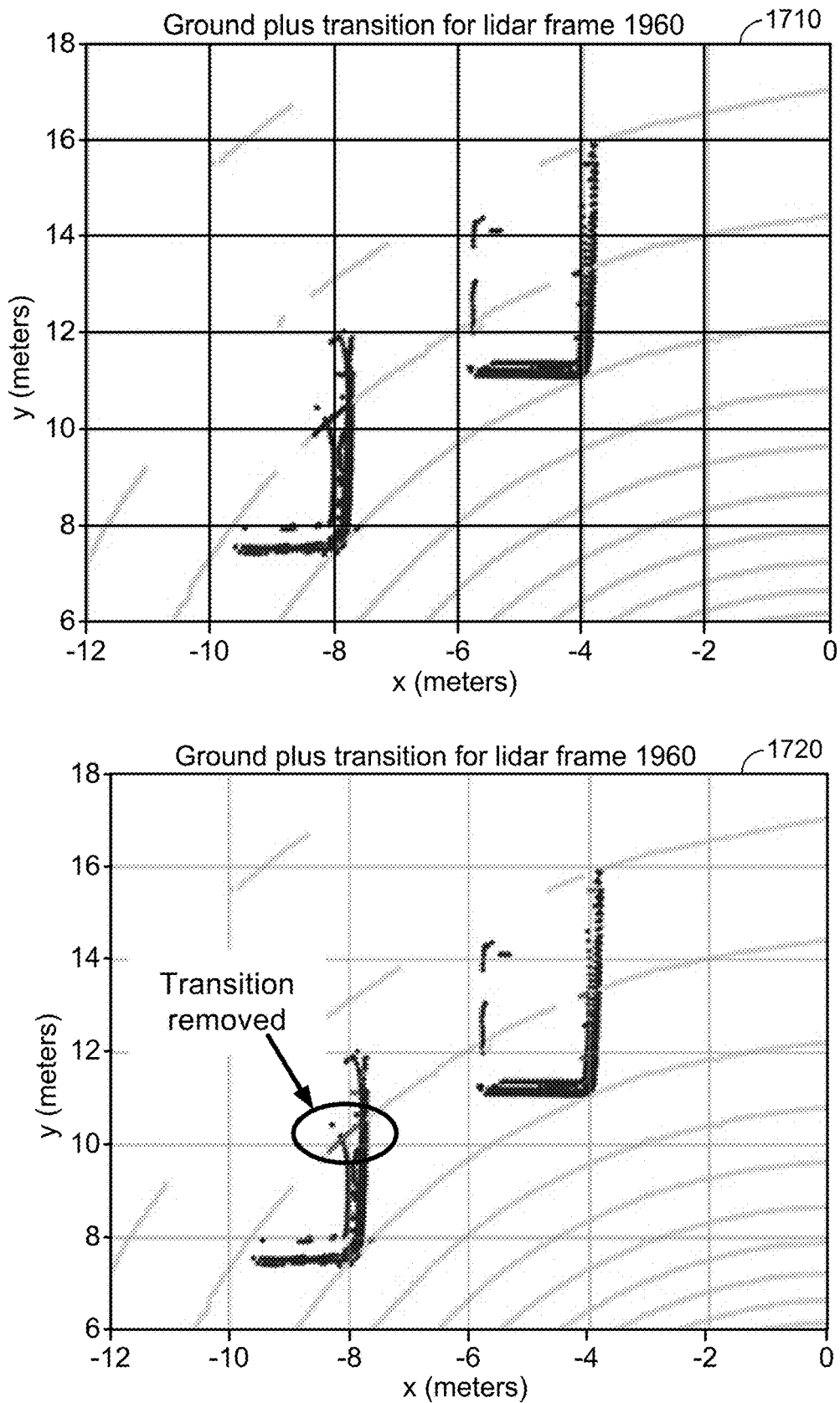
FIG. 17 illustrates a first LiDAR frame and a second LiDAR frame in which a transition has been detected and removed, according to aspects of the disclosure.

FIG. 17 illustrates a first LiDAR frame 1710 and a second LiDAR frame 1720 in which a transition has been detected and removed, according to aspects of the disclosure. The first and second LiDAR frames 1710 and 1720 may correspond to frame 1960 in the earlier examples described herein. In the first LiDAR frame 1710, a transition has been detected, and in the second LiDAR frame 1720, the transition has been removed. This improves the differentiation of the LiDAR points associated with the ground and the detected object.

Incorporating this operation into the method 900 of FIG. 9, at the end of stage 910, each point in the LiDAR point cloud would be labeled either ground, transition, or occupied. The occupied points are considered for object segmentation while the ground points are considered for lane marker detection. Transition points are not used for either processing.

In an aspect, object detections and annotations from multiple vehicles can be combined. For example, where two test vehicles are being driven in close proximity, they are likely to "see" the same target vehicles, but from slightly different perspectives. As such, the annotations generated according to method 900 by one vehicle can be used to augment the annotations generated according to method 900 by the other vehicle(s).

More specifically, the disclosed techniques aim at generating annotations (e.g., location, orientation, velocity, and dimensions) for objects (e.g., vehicles) detected in LiDAR frames to train deep learning neural network-based object detection for imaging radar or camera. Both camera and imaging radar may have a range of 200-300 m, which is required for autonomous highway driving. However, this range is not matched by current LiDAR sensors, and is even more challenging for more recent LiDAR sensors focusing on range. To work around this LiDAR limitation, LiDAR data from more than one test vehicle can be collected, and these test vehicles, each equipped with a full suite of sensors (LiDAR, camera, imaging radar, and high precision GPS), could be spaced apart, for example, 50 to 100 m, while driving.

After collecting data from at least two test vehicles, each equipped with a full suite of sensors, there would be at least two separate data sets, including two sets of LiDAR measurements, one from each vehicle. To merge the LiDAR measurements, they must be in the same coordinate system. Therefore, both sets of LiDAR measurements are projected into the ENU frame using the GPS positioning systems on the vehicles with LiDAR sensors. Since LiDAR sensors use rotating beams (see, e.g., FIG. 7), the LiDAR point cloud measurements made by the two or more LiDAR sensors would not be obtained at the same time. From an algorithmic standpoint, it is therefore easier to merge LiDAR measurements after the annotations have been generated for the individual LiDAR sensors, as opposed to merging multiple LiDAR point clouds in an ENU frame and then running the LiDAR annotation algorithm (i.e., method 900 of FIG. 9) once.

Target objects (e.g., vehicles) within range of both LiDAR sensors will overlap, while target objects in range of just one sensor will appear only once. To address this, the algorithm first concatenates target object annotations from both test vehicles, detects overlapping annotations, and removes the annotation(s) with smaller dimensions. For example, if a LiDAR sensor only saw, for example, the back of a vehicle, the annotation algorithm would likely underestimate the target vehicle's length. After merging, the 3D bounding box can be projected from the ENU frame to the camera or imaging radar coordinate frame of either vehicle.

Figure 18:
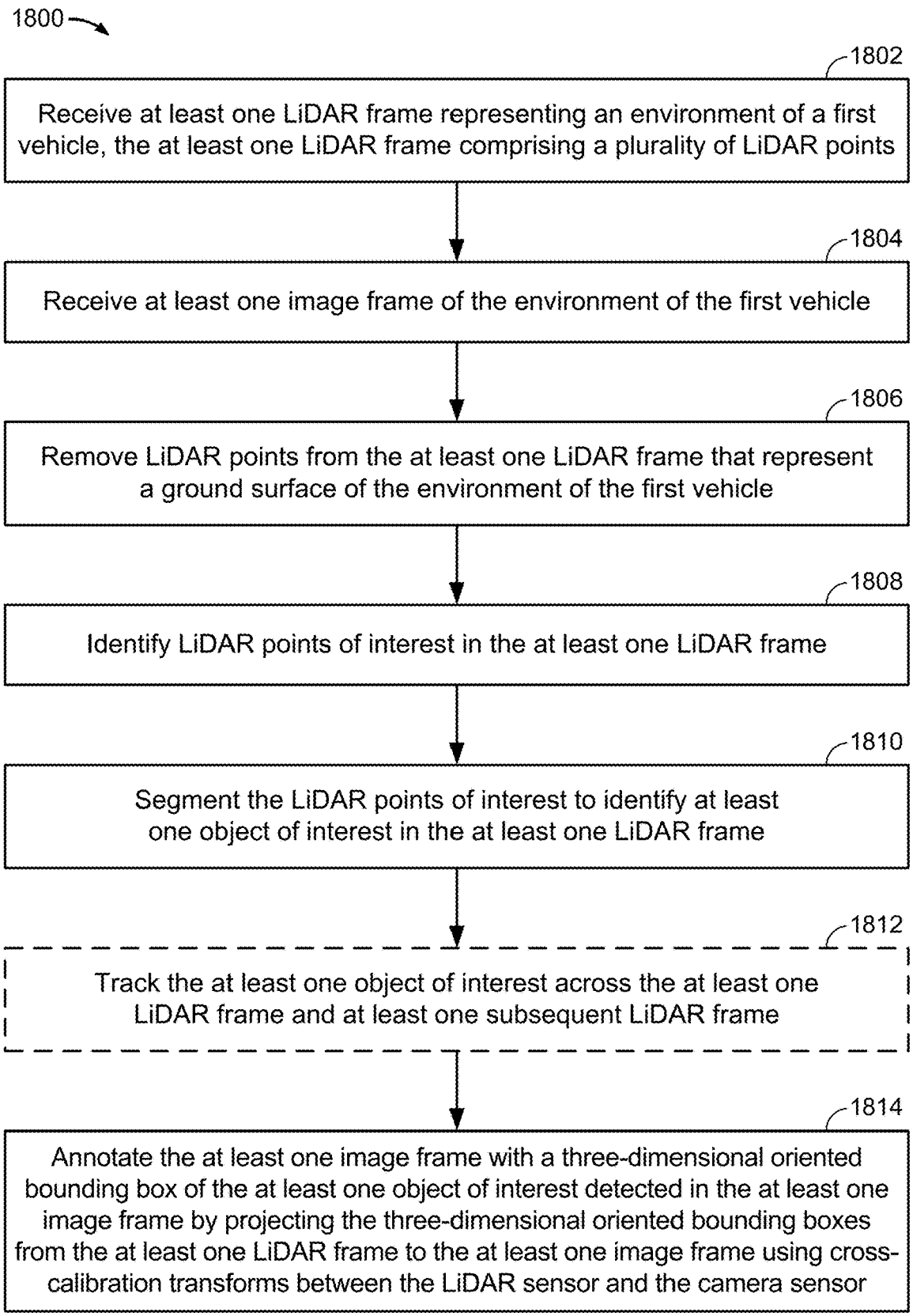
FIG. 18 illustrates an exemplary method for annotating image frames using information from a LiDAR sensor, according to aspects of the disclosure.

FIG. 18 illustrates an exemplary method 1800 for annotating image frames using information from a LiDAR sensor (e.g., LiDAR sensor 216), according to aspects of the disclosure. The method 1800 may be performed by one or more processors to train an object-detection neural network.

At 1802, the one or more processors receive at least one LiDAR frame (e.g., captured by LiDAR sensor 216) representing an environment of a first vehicle (e.g., vehicle 100). The at least one LiDAR frame may comprise a plurality of LiDAR points (i.e., a "point cloud"). At 1804, the one or more processors receive at least one image frame (e.g., captured by camera 212 or radar sensor 214) of the environment of the first vehicle. At 1806, the one or more processors remove LiDAR points from the at least one LiDAR frame that represent a ground surface of the environment of the first vehicle, as described above with reference to 910 of FIG. 9. At 1808, the one or more processors identify LiDAR points of interest in the at least one LiDAR frame, as described above with reference to 920 of FIG. 9. At 1810, the one or more processors segment the LiDAR points of interest to identify at least one object of interest (e.g., vehicle 130, 140) in the at least one LiDAR frame, as described above with reference to 930 of FIG. 9. At 1812, the one or more processors optionally track the at least one object of interest across the at least one LiDAR frame and at least one subsequent LiDAR frame, as described above with reference to 940 of FIG. 9. At 1814, the one or more processors annotate the at least one image frame with a three-dimensional oriented bounding box of the at least one object of interest detected in the at least one image frame by projecting the three-dimensional oriented bounding boxes from the at least one LiDAR frame to the at least one image frame using cross-calibration transforms between the LiDAR sensor 216 and the camera 212 or between the LiDAR sensor 216 and the imaging radar sensor 214, as described above with reference to 950 of FIG. 9.

Figure 19:
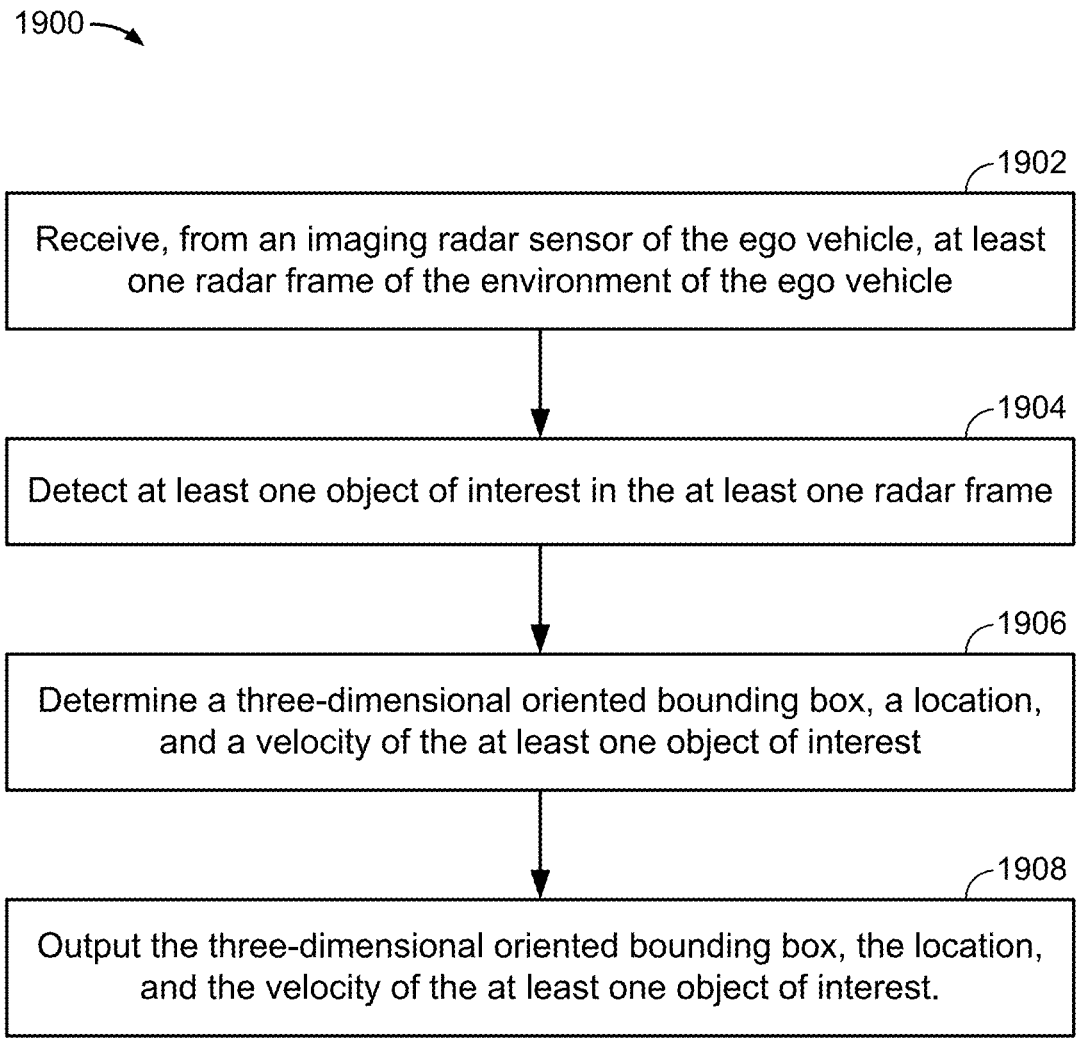
FIG. 19 illustrates an exemplary method performed by an ego vehicle, according to aspects of the disclosure.

FIG. 19 illustrates an exemplary method 1900 according to aspects of the disclosure. The method 1900 may be performed by at least one processor (e.g., processor(s) 206) of an ego vehicle (e.g., vehicle 100) implementing an object-detection neural network that has been trained as described herein. The ego vehicle need not be equipped with a LiDAR sensor (e.g., LiDAR sensor 216), as the method 1900 does not require information from a LiDAR sensor.

At 1902, the at least one processor receives, from an imaging radar sensor (e.g., radar 214) of the ego vehicle, at least one radar frame of the environment of the ego vehicle.

At 1904, the at least one processor detects at least one object of interest in the at least one radar frame. The at least one process may use an object-detection neural network to detect the at least one object of interest in the at least one radar frame.

At 1906, the at least one processor determines a three-dimensional oriented bounding box, a location, and a velocity of the at least one object of interest.

At 1908, the at least one processor outputs the three-dimensional oriented bounding box, the location, and the velocity of the at least one object of interest.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying the methods described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for annotating image frames using information from a light detection and ranging (LiDAR) sensor, comprising:
   receiving, from the LiDAR sensor of a first vehicle, at least one LiDAR frame representing an environment of the first vehicle, the at least one LiDAR frame comprising a plurality of LiDAR points;
   receiving, from a camera sensor or an imaging radar sensor, at least one image frame of the environment of the first vehicle;
   removing LiDAR points from the at least one LiDAR frame that represent a ground surface of the environment of the first vehicle;
   identifying LiDAR points of interest in the at least one LiDAR frame;
   segmenting the LiDAR points of interest to identify at least one object of interest in the at least one LiDAR frame; and
   annotating the at least one image frame with a three-dimensional oriented bounding box of the at least one object of interest detected in the at least one image frame by projecting the three-dimensional oriented bounding box from the at least one LiDAR frame to the at least one image frame using cross-calibration transforms between the LiDAR sensor and the camera sensor or between the LiDAR sensor and the imaging radar sensor.

2. The method of claim 1, further comprising:
   training an object-detection neural network to detect the at least one object of interest in the radar frame or the image frame based on the three-dimensional oriented bounding box.

3. The method of claim 2, wherein the object-detection neural network is implemented by a processor of a vehicle that does not have a LiDAR sensor.

4. The method of claim 1, further comprising:
   tracking the at least one object of interest across the at least one LiDAR frame and at least one subsequent LiDAR frame.

5. The method of claim 4, wherein tracking the at least one object of interest comprises:
   determining dimensions of the at least one object of interest when the at least one object of interest is within a threshold distance of the first vehicle.

6. The method of claim 1, wherein segmenting the LiDAR points of interest comprises:
   creating an adjacency graph representing the LiDAR points of interest in the at least one LiDAR frame; and
   identifying a plurality of connected components within the adjacency graph as corresponding to the at least one object of interest.

7. The method of claim 1, wherein the image frame comprises an imaging radar image frame.

8. The method of claim 1, wherein the image frame comprises a camera image frame.

9. The method of claim 1, wherein the camera sensor captures the at least one image frame of the environment of the first vehicle at a corresponding point in time as the LiDAR frame.

10. The method of claim 1, wherein the at least one object of interest comprises at least one vehicle.

11. The method of claim 1, further comprising:
receiving, from a LiDAR sensor of a second vehicle, at least one second LiDAR frame representing an environment of the second vehicle, the at least one second LiDAR frame comprising a second plurality of LiDAR points;
receiving, from a camera sensor or an imaging radar sensor of the second vehicle, at least one second image frame of the environment of the second vehicle;
removing LiDAR points from the at least one second LiDAR frame that represent a ground surface of the environment of the second vehicle;
identifying second LiDAR points of interest in the at least one second LiDAR frame;
segmenting the second LiDAR points of interest to identify at least one second object of interest in the at least one second LiDAR frame; and
annotating the at least one second image frame with a second three-dimensional oriented bounding box of the at least one second object of interest detected in the at least one second image frame by projecting the second three-dimensional oriented bounding box from the at least one second LiDAR frame to the at least one second image frame using cross-calibration transforms between the LiDAR sensor and the camera sensor or the imaging radar sensor of the second vehicle.

12. The method of claim 11, wherein the at least one image frame is further annotated with the second three-dimensional oriented bounding box of the at least one second object of interest by projecting the second three-dimensional oriented bounding box from the at least one second LiDAR frame to the at least one image frame using cross-calibration transforms between the LiDAR sensor of the second vehicle and the camera sensor or the imaging radar sensor of the first vehicle.

13. A method performed by at least one processor of an ego vehicle, comprising:
receiving, from an imaging radar sensor of the ego vehicle, at least one radar frame of the environment of the ego vehicle;
detecting at least one object of interest in the at least one radar frame;
determining a three-dimensional oriented bounding box, a location, and a velocity of the at least one object of interest; and
outputting the three-dimensional oriented bounding box, the location, and the velocity of the at least one object of interest, wherein an object-detection neural network is used to detect the at least one object of interest in the at least one radar frame and the object-detection neural network is trained using radar frame data annotated with light detection and ranging (LiDAR) data.

14. The method of claim 13, wherein the at least one object of interest comprises at least one vehicle.

15. An apparatus for annotating image frames using information from a light detection and ranging (LiDAR) sensor, comprising:
at least one processor configured to:
receive, from the LiDAR sensor of a first vehicle, at least one LiDAR frame representing an environment of the first vehicle, the at least one LiDAR frame comprising a plurality of LiDAR points;
receive, from a camera sensor or an imaging radar sensor, at least one image frame of the environment of the first vehicle;
remove LiDAR points from the at least one LiDAR frame that represent a ground surface of the environment of the first vehicle;
identify LiDAR points of interest in the at least one LiDAR frame;
segment the LiDAR points of interest to identify at least one object of interest in the at least one LiDAR frame; and
annotate the at least one image frame with a three-dimensional oriented bounding box of the at least one object of interest detected in the at least one image frame by projecting the three-dimensional oriented bounding box from the at least one LiDAR frame to the at least one image frame using cross-calibration transforms between the LiDAR sensor and the camera sensor or between the LiDAR sensor and the imaging radar sensor.

16. The apparatus of claim 15, wherein the at least one processor is further configured to:
train an object-detection neural network to detect the at least one object of interest in the radar frame or the image frame based on the three-dimensional oriented bounding box.

17. The apparatus of claim 15, wherein the at least one processor is further configured to:
track the at least one object of interest across the at least one LiDAR frame and at least one subsequent LiDAR frame.

18. The apparatus of claim 17, wherein the at least one processor being configured to track the at least one object of interest comprises the at least one processor being configured to:
determine dimensions of the at least one object of interest when the at least one object of interest is within a threshold distance of the first vehicle.

19. The apparatus of claim 15, wherein the at least one processor being configured to segment the LiDAR points of interest comprises the at least one processor being configured to:
create an adjacency graph representing the LiDAR points of interest in the at least one LiDAR frame; and
identify a plurality of connected components within the adjacency graph as corresponding to the at least one object of interest.

20. The apparatus of claim 15, wherein the image frame comprises an imaging radar image frame.

21. The apparatus of claim 15, wherein the image frame comprises a camera image frame.

22. The apparatus of claim 15, wherein the camera sensor captures the at least one image frame of the environment of the first vehicle at a corresponding point in time as the LiDAR frame.

23. The apparatus of claim 15, wherein the at least one processor is further configured to:
receive, from a LiDAR sensor of a second vehicle, at least one second LiDAR frame representing an environment of the second vehicle, the at least one second LiDAR frame comprising a second plurality of LiDAR points;
receive, from a camera sensor or an imaging radar sensor of the second vehicle, at least one second image frame of the environment of the second vehicle;

remove LiDAR points from the at least one second LiDAR frame that represent a ground surface of the environment of the second vehicle;

identify second LiDAR points of interest in the at least one second LiDAR frame;

segment the second LiDAR points of interest to identify at least one second object of interest in the at least one second LiDAR frame; and annotate the at least one second image frame with a second three-dimensional oriented bounding box of the at least one second object of interest detected in the at least one second image frame by projecting the second three-dimensional oriented bounding box from the at least one second LiDAR frame to the at least one second image frame using cross-calibration transforms between the LiDAR sensor and the camera sensor or the imaging radar sensor of the second vehicle.

24. The apparatus of claim 23, wherein the at least one image frame is further annotated with the second three-dimensional oriented bounding box of the at least one second object of interest by projecting the second three-dimensional oriented bounding box from the at least one second LiDAR frame to the at least one image frame using cross-calibration transforms between the LiDAR sensor of the second vehicle and the camera sensor or the imaging radar sensor of the first vehicle.

25. An ego vehicle, comprising:
at least one processor configured to:
receive, from an imaging radar sensor of the ego vehicle, at least one radar frame of the environment of the ego vehicle;

detect at least one object of interest in the at least one radar frame;

determine a three-dimensional oriented bounding box, a location, and a velocity of the at least one object of interest; and output the three-dimensional oriented bounding box, the location, and the velocity of the at least one object of interest, wherein an object-detection neural network is used to detect the at least one object of interest in the at least one radar frame and the object-detection neural network is trained using radar frame data annotated with light detection and ranging (LiDAR) data.

26. The ego vehicle of claim 25, wherein the at least one object of interest comprises at least one vehicle.

* * * * *